(12) United States Patent
Morikubo et al.

(10) Patent No.: US 11,833,665 B2
(45) Date of Patent: Dec. 5, 2023

(54) ARTICLE LOADING FACILITY

(71) Applicant: Daifuku Co., Ltd., Osaka (JP)

(72) Inventors: Mitsuo Morikubo, Tokyo (JP);
Yoshikazu Tai, Tokyo (JP); Takuya Gondoh, Tokyo (JP); Masami Iwai, Tokyo (JP); Atsushi Minoo, Tokyo (JP); Shigeru Sugano, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 443 days.

(21) Appl. No.: 17/293,646

(22) PCT Filed: Nov. 12, 2019

(86) PCT No.: PCT/JP2019/044373
§ 371 (c)(1),
(2) Date: May 13, 2021

(87) PCT Pub. No.: WO2020/100908
PCT Pub. Date: May 22, 2020

(65) Prior Publication Data
US 2022/0009108 A1    Jan. 13, 2022

(30) Foreign Application Priority Data
Nov. 14, 2018   (JP) .................................. 2018-213662

(51) Int. Cl.
*B25J 13/08*     (2006.01)
*B65G 47/90*    (2006.01)
(Continued)

(52) U.S. Cl.
CPC ............ *B25J 13/08* (2013.01); *B65G 47/905* (2013.01); *B65G 47/917* (2013.01); *B65G 57/04* (2013.01);
(Continued)

(58) Field of Classification Search
CPC ...... B25J 13/08; B65G 47/905; B65G 47/917; B65G 57/04; B65G 61/00; B65G 2201/02;
(Continued)

(56) References Cited

U.S. PATENT DOCUMENTS 10,899,002 B2 *   1/2021   Sezaki ................... B25J 9/1697
2007/0248448 A1 *  10/2007  Starz ...................... B65G 61/00
                                                                    414/788
(Continued)

FOREIGN PATENT DOCUMENTS

JP            201540120 A       3/2015

*Primary Examiner* — Jason Holloway
(74) *Attorney, Agent, or Firm* — THE WEBB LAW FIRM

(57) ABSTRACT

A control unit executes first loading control if it is determined that a loaded article is not present above a loading surface region based on captured image information, and second loading control if it is determined that it is uncertain whether the loaded article is not present above the loading surface region based on the captured image information. The first loading control causing a holding unit to release a target article when the target article is directly above the loading surface region and the lower surface of the target article is higher than the upper surface of the loading surface region by a first specified distance, and the second loading control causing the holding unit to release the target article when the target article is directly above the loading surface region and the lower surface of the target article is higher, by a second specified distance, than a specified height.

5 Claims, 14 Drawing Sheets

(51) Int. Cl.
  *B65G 47/91* (2006.01)
  *B65G 57/04* (2006.01)
  *B65G 61/00* (2006.01)

(52) U.S. Cl.
  CPC .......... *B65G 61/00* (2013.01); *B65G 2201/02* (2013.01); *B65G 2203/041* (2013.01)

(58) Field of Classification Search
  CPC .............. B65G 2203/041; B65G 43/08; B65G 47/915; B65G 59/04; B65G 60/00; G05B 19/042
  See application file for complete search history.

(56) References Cited

U.S. PATENT DOCUMENTS

2018/0015619 A1* 1/2018 Kato ..................... B25J 13/087
2018/0065817 A1* 3/2018 Gondoh ................ B65G 57/22

* cited by examiner

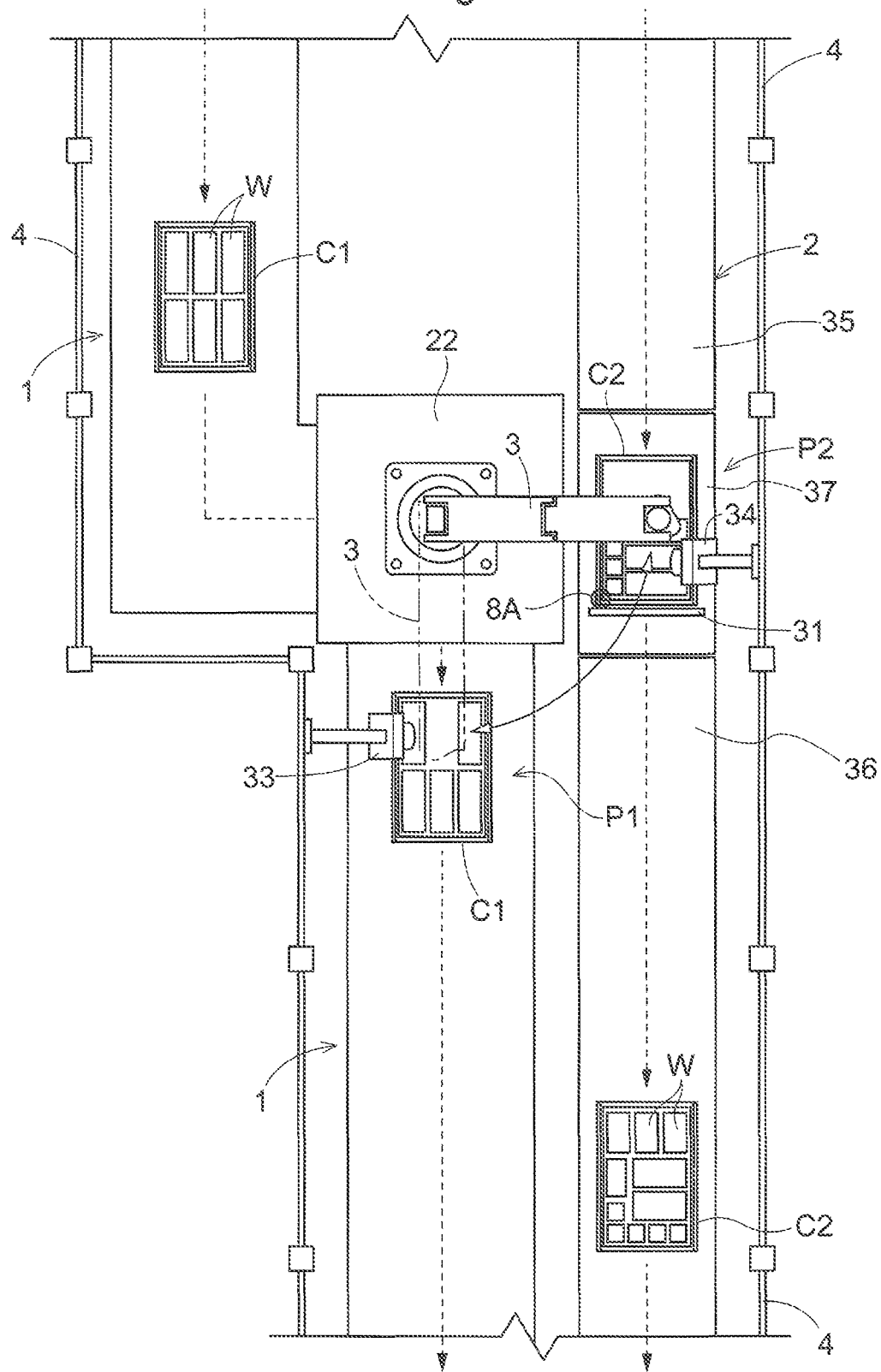

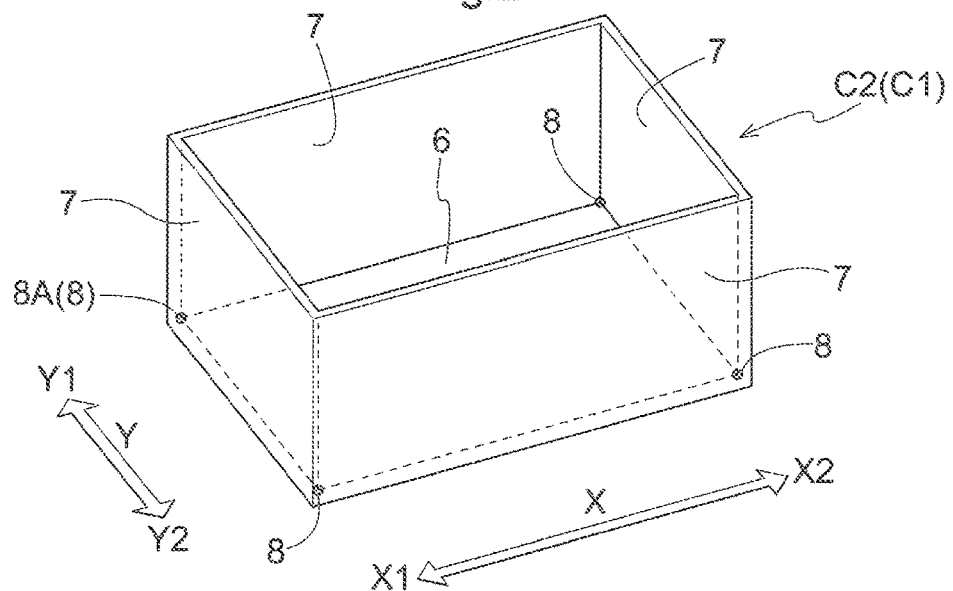
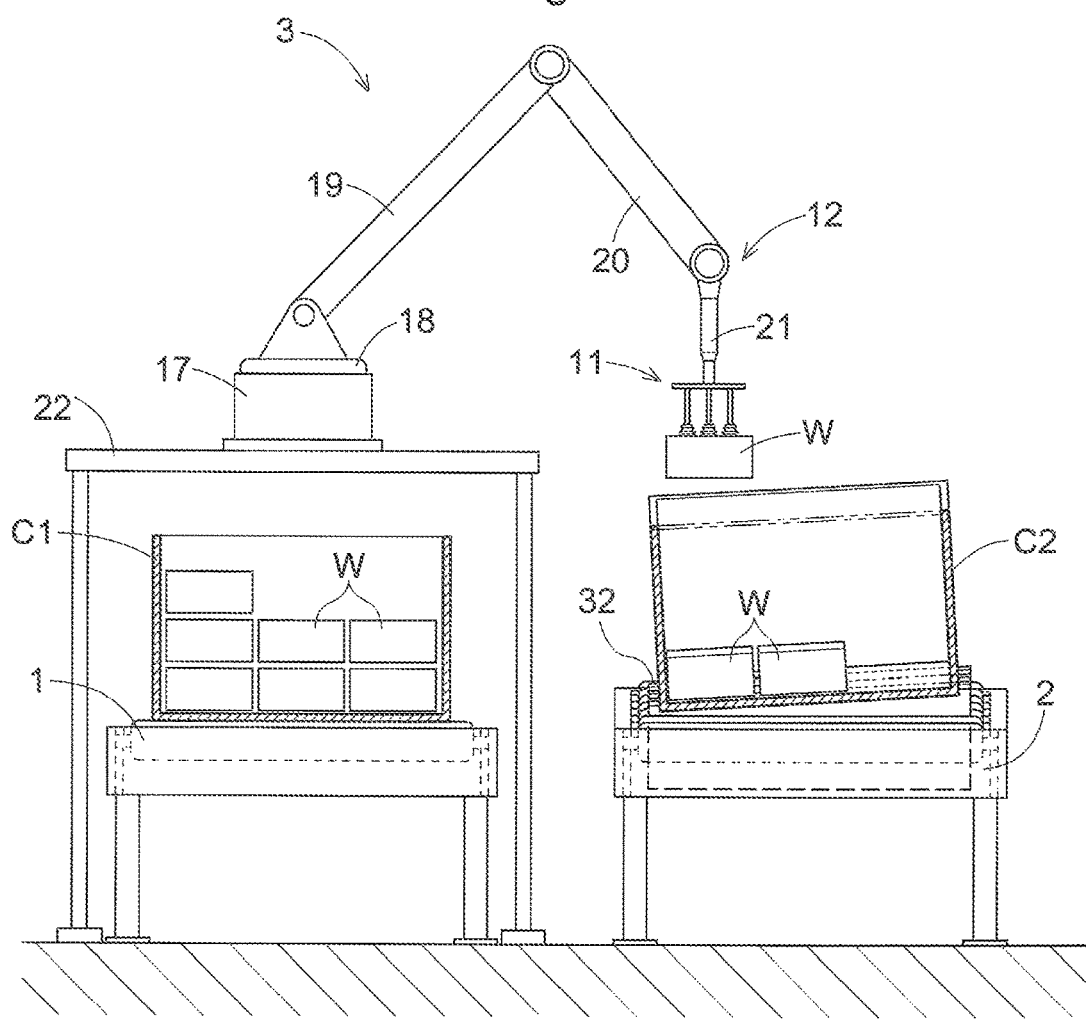

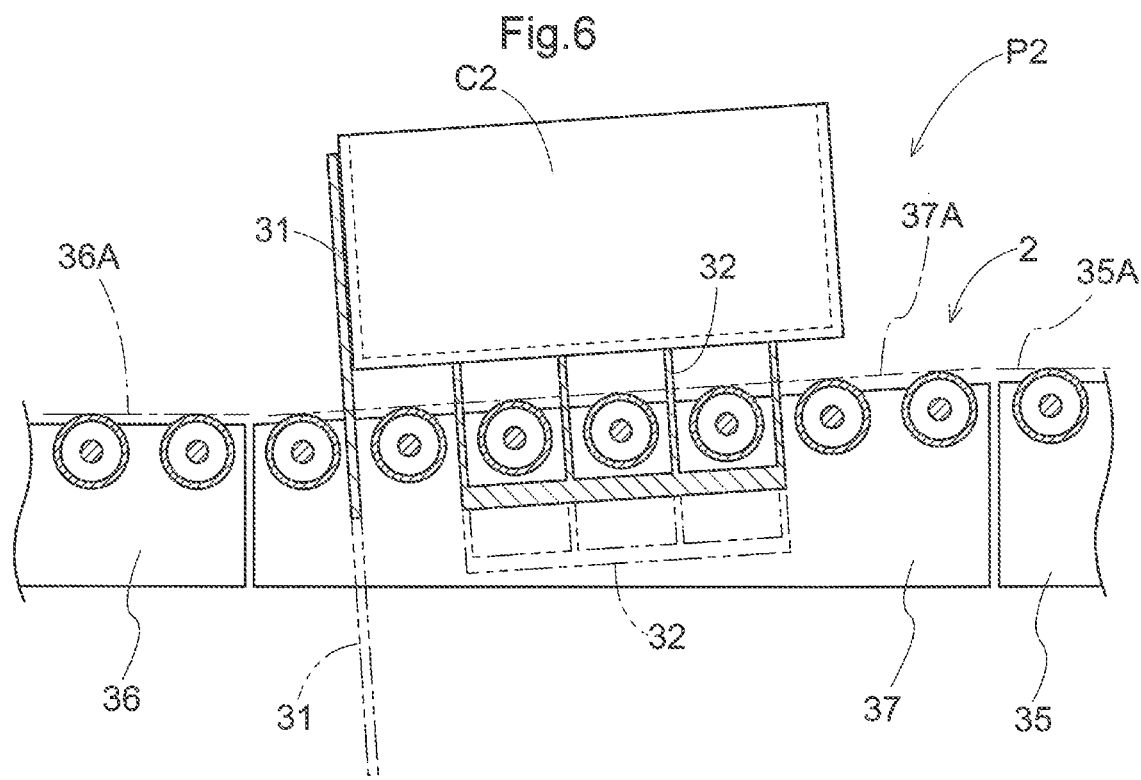
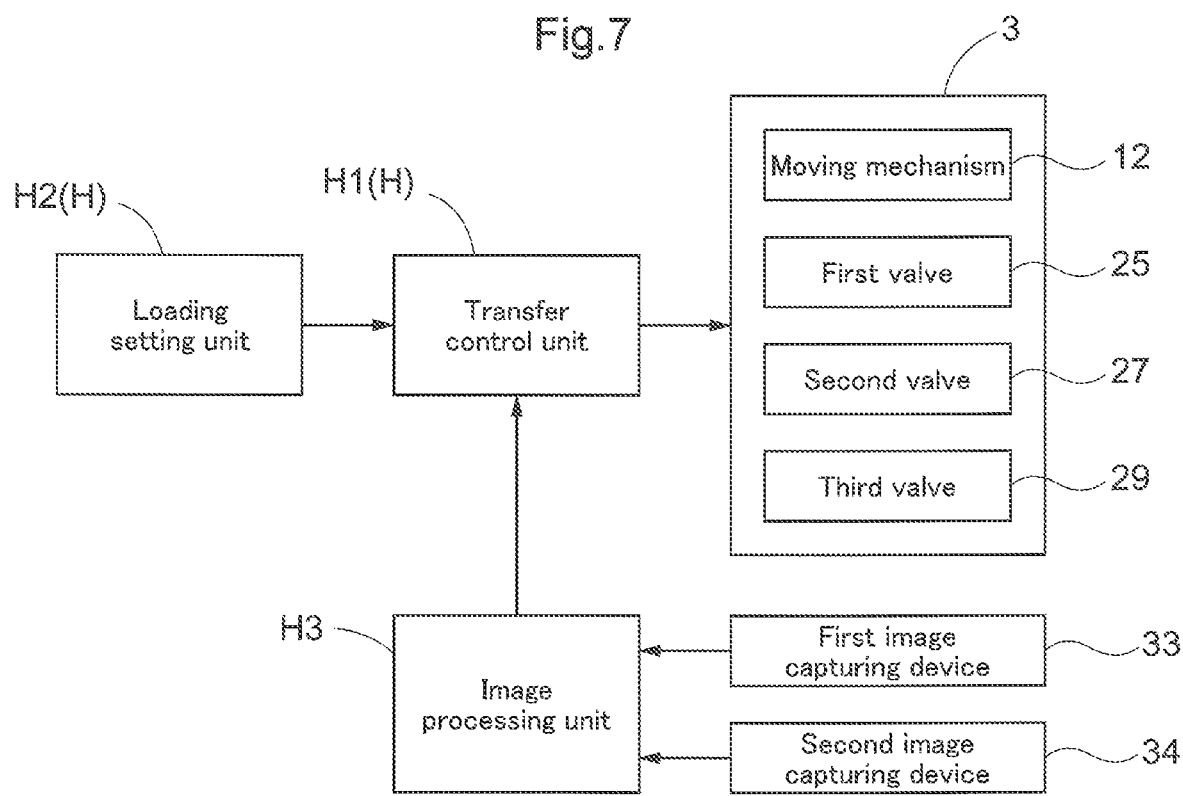

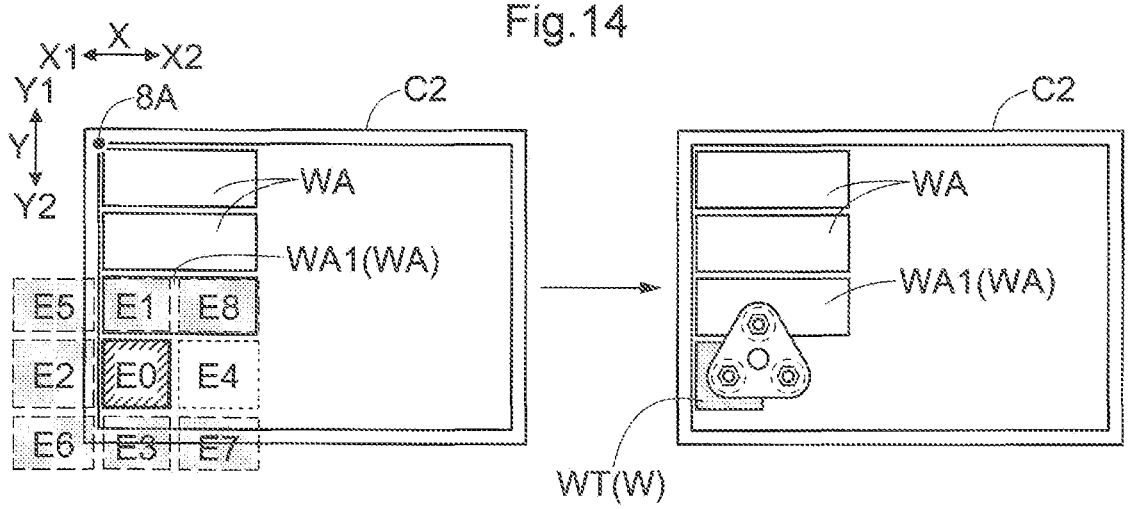
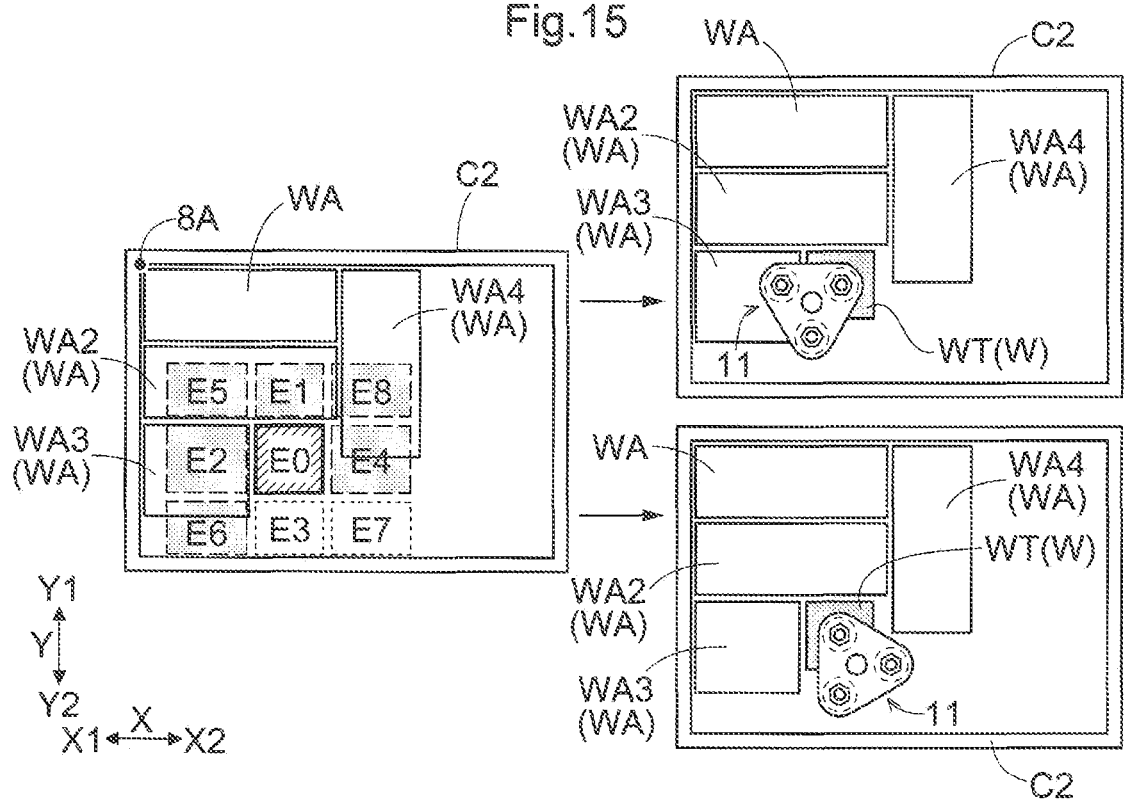

ARTICLE LOADING FACILITY

CROSS-REFERENCE TO RELATED APPLICATIONS

This application is the United States national phase of International Application No. PCT/JP2019/044373 filed Nov. 12, 2019, and claims priority to Japanese Patent Application No. 2018-213662 filed Nov. 14, 2018, the disclosures of which are hereby incorporated by reference in their entirety.

BACKGROUND OF THE INVENTION

1. Field of the Invention

The present invention relates to an article loading facility that includes a loading operation unit for loading a plurality of articles on a support and a control unit for controlling the loading operation unit.

2. Description of Related Art

Japanese Patent Application Laid-Open No. 2015-040120 (Patent Document 1) describes an example of the above-mentioned article loading facility. In the article loading facility of Patent Document 1, a control device H (control unit) controls a transfer robot 4 (loading operation unit) so as to place articles on a basket car 3 (support) in accordance with arrangement information.
Patent Document 1: JP 2015-040120A

SUMMARY OF THE INVENTION

Such an article loading facility is often configured as follows. Specifically, the control unit performs control such that, when a target article that is one of a plurality of articles is to be placed on the support by the loading operation unit, a loading surface region is set, based on the arrangement information, on the upper surface of the support or on the upper surface of an article that has already been placed on the support (i.e., a loaded article), a holding unit is moved such that the target article held by the holding unit is located directly above the loading surface region and the lower surface of the target article is located a specified distance higher than the upper surface of the loading surface region, and then the target article is released by the holding unit so as to be placed on the support.

However, when the target article is placed on the loading surface region by the loading operation unit, there are cases where the target article is placed on the support in a position and orientation that deviate from those indicated in the arrangement information for some reason. In such a case, when a subsequent target article is to be placed on the support, the loaded article may be present in the loading surface region on which the target article is to be placed. If an attempt is made to place the target article on the support in such a state, the target article and the loaded article may come into contact with each other, and the target article or the loaded article may be damaged.

In view of this, there is desire for the realization of an article loading facility that can prevent damage to articles.

An article loading facility according to the present disclosure includes: a loading operation unit configured to place a plurality of articles on a support; and a control unit configured to control the loading operation unit, the loading operation unit including a holding unit configured to hold upper portions of the articles, and the control unit controlling the loading operation unit so as to place the articles on the support in accordance with arrangement information that indicates an orientation and a position on the support for each of the articles, wherein the article loading facility further includes an image capturing device that is disposed above the support and is configured to capture an image of the support and a loaded article, the loaded article being an article that has been placed on the support, the control unit executes setting control for setting a loading surface region on which a target article among the articles is to be placed on an upper surface of the support or an upper surface of the loaded article, first loading control that is executed if it was determined that the loaded article is not present above the loading surface region based on captured image information obtained by the image capturing device, and second loading control that is executed if it was determined that it is uncertain whether the loaded article is not present above the loading surface region based on the captured image information, the first loading control is control for placing the target article on the support by causing the holding unit to release the target article at a position at which the target article is directly above the loading surface region and furthermore a lower surface of the target article is higher than the upper surface of the loading surface region by a first specified distance, and the second loading control is control for placing the target article on the support by causing the holding unit to release the target article at a position at which the target article is directly above the loading surface region and furthermore the lower surface of the target article is higher, by a second specified distance, than a height at which it is uncertain whether the loaded article is not present in the loading surface region.

According to this configuration, the control unit executes the first loading control if it was determined that the loaded article is not present above the loading surface region based on the captured image information obtained by the image capturing device. In this first loading control, the target article is placed on the loading surface region in a state where a loaded article is not present above the loading surface region, and therefore the target article can be placed on the loading surface region without coming into contact with a loaded article adjacent to the target article. Also, by releasing the target article in a state of being close to the loading surface region, it is easy to appropriately place the target article on the loading surface region in accordance with the arrangement information.

Also, if it was determined that it is uncertain whether a loaded article is not present above the loading surface region based on the captured image information, the control unit executes the second loading control. In this second loading control, the target article is released when the lower surface of the target article is higher than the uncertain height, thus making it possible to avoid the case where the target article held by the holding unit comes into contact with a loaded article that is present above the loading surface region, and making it possible to prevent damage to the loaded article and the target article.

BRIEF DESCRIPTION OF THE DRAWINGS

FIG. 1 is a plan view of an article loading facility.
FIG. 2 is a perspective view of a second container.
FIG. 3 is a front view of the article loading facility.

FIG. 6 is a side view of a second transport position.

FIG. 7 is a control block diagram.

FIG. 14 is a diagram showing a state in which a target article held in a first holding state is transferred to the loading position.

FIG. 15 is a diagram showing a state in which a target article held in the second holding state or a third holding state is transferred to the loading position.

DETAILED DESCRIPTION OF PREFERRED EMBODIMENTS

1. Embodiment

Figure 4:
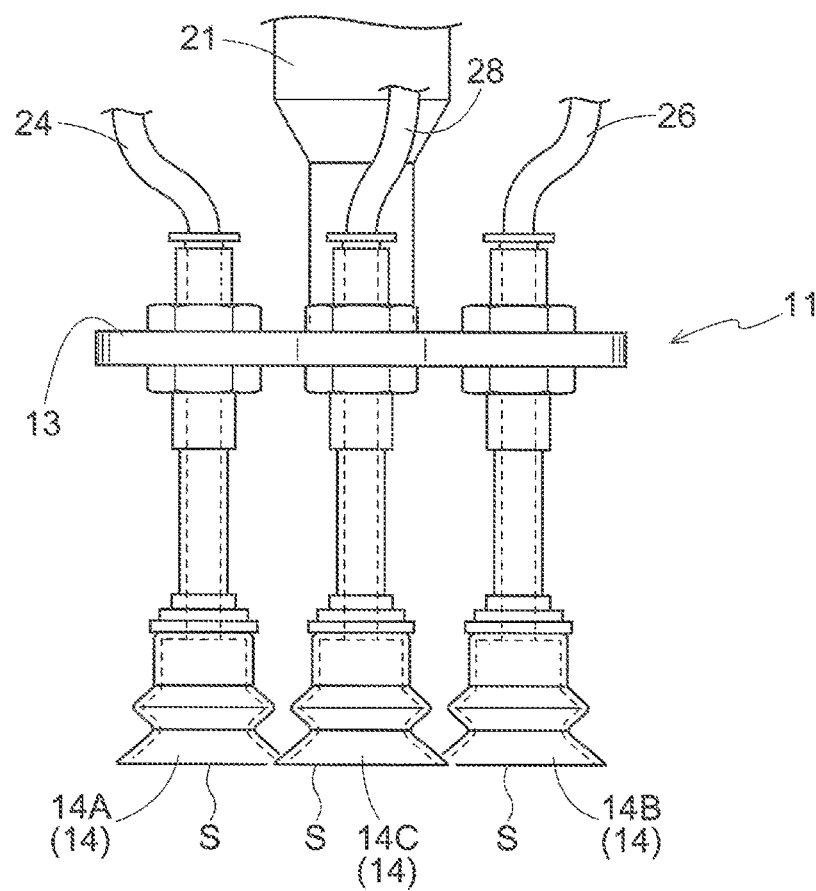
FIG. 4 is a side view of a holding unit.

An embodiment of an article loading facility will be described below with reference to the drawings.

As shown in FIG. 1, the article loading facility includes a first conveyor 1 for transporting a first container C1, a second conveyor 2 for transporting a second container C2, a transfer device 3 for transferring articles W from the first container C1 to the second container C2, and a fence 4 that surrounds an installation region where the first conveyor 1, the second conveyor 2, and the transfer device 3 are disposed.

The first conveyor 1 is constituted by a roller conveyor and transports the first container C1 in one direction as shown by an arrow in FIG. 1. A first transport position P1 is set at a position along the transport path of the first conveyor 1. The first conveyor 1 is configured to transport the first container C1 from a first transport origin (not shown) to the first transport position P1, and also transport the first container C1 from the first transport position P1 to a first transport destination (not shown). One or more articles W are stored in the first container C1 that is transported to the first transport position P1 by the first conveyor 1, and articles W of the same type are stored in one first container C1.

The second conveyor 2 is constituted by a roller conveyor and transports the second container C2 in one direction as shown by an arrow in FIG. 1. A second transport position P2 is set at a position along the transport path of the second conveyor 2. The second conveyor 2 is configured to transport the second container C2 from a second transport origin (not shown) to the second transport position P2, and also transport the second container C2 from the second transport position P2 to a second transport destination (not shown). No articles W are stored in the second container C2 that is transported to the second transport position P2 by the second conveyor 2, but articles W of one or multiple types that have been transferred by the transfer device 3 are stored in the second container C2 that is transported from the second transport position P2.

Specifically, in the article loading facility, the first container C1 storing the article W is transported to the first transport position P1 by the first conveyor 1, and the empty second container C2 is transported to the second transport position P2 by the second conveyor 2. Then, the transfer device 3 takes out an article W from the first container C1 located at the first transport position P1 and stores the taken-out article W in the second container C2 located at the second transport position P2, thus transferring the article W from the first container C1 to the second container C2.

After all of the articles W that are to be taken out of the first container C1 have been taken out, the first container C1 is transported away from the first transport position P1 by the first conveyor 1. Also, after all of the articles W that are to be stored in the second container C2 have been stored therein, the second container C2 is transported away from the second transport position P2 by the second conveyor 2.

As shown in FIG. 2, the first container C1 and the second container C2 each include a loading portion 6 on which an article W is placed and a side wall portion 7 that rises from the peripheral edge portion of the loading portion 6, and a cardboard box or container that is box-shaped with an open top is used. In the present embodiment, foldable containers are used as the first container C1 and the second container C2. The loading portion 6 is formed in a rectangular shape when viewed in the vertical direction, and includes four corner portions 8. Note that the loading portion 6 of the second container C2 corresponds to a support. Also, in the present embodiment, the placement of the article W on the loading portion 6 of the second container C2 will be referred to as storing the article W in the second container C2.

As shown in FIG. 1, the second container C2 is transported by the second conveyor 2 in an orientation in which a lengthwise direction X of the second container C2 extends along the transport direction of the second conveyor 2. Therefore, at the second transport position P2, the second container C2 is positioned in an orientation in which the lengthwise direction X of the second container C2 extends along the transport direction of the second conveyor 2 and a widthwise direction Y of the second container C2 extends along the width direction of the second conveyor 2. Also, one of the four corner portions 8 is designated as a target corner portion 8A. With respect to the lengthwise direction X, the side where the target corner portion 8A exists relative to the center of the second container C2 is a first lengthwise side X1, and the opposite side is a second lengthwise side X2. Also, with respect to the widthwise direction Y, the side where the target corner portion 8A exists relative to the center of the second container C2 is a first widthwise side Y1, and the opposite side is a second widthwise side Y2.

Next, the transfer device 3 will be described.

As shown in FIG. 3, the transfer device 3 includes a holding unit 11 for holding the upper surface of the article W and a moving mechanism 12 for moving the holding unit 11. Note that the transfer device 3 corresponds to a loading operation unit for placing a plurality of articles W on the loading portion 6 of the second container C2.

The moving mechanism 12 includes a pedestal portion 17, a rotating portion 18, a first arm 19, a second arm 20, and a third arm 21. The pedestal portion 17 is fixed to a platform 22. The rotating portion 18 is supported by the pedestal portion 17 so as to be able to rotate around an axis extending along the vertical direction. The base end portion of the first arm 19 is swingably coupled to the rotating portion 18. The base end portion of the second arm 20 is swingably coupled to the leading end portion of the first arm 19. The base end portion of the third arm 21 is swingably coupled to the leading end portion of the second arm 20. Also, a support portion 13 is non-swingably coupled to the leading end portion of the third arm 21.

The moving mechanism 12 moves the holding unit 11 by rotating the rotating portion 18 and swinging the first arm 19, the second arm 20, and the third arm 21.

Figure 5:
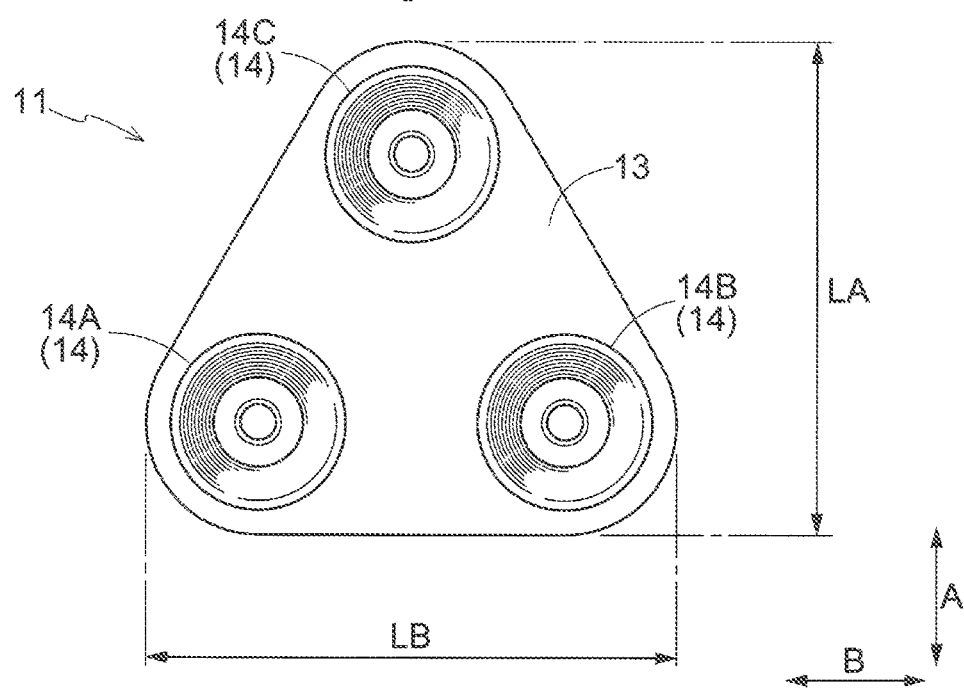
FIG. 5 is a bottom view of the holding unit.

As shown in FIGS. 4 and 5, the holding unit 11 includes a support portion 13 that is coupled to the moving mechanism 12 and a plurality of suction pads 14 that are supported by the support portion 13. In the present embodiment, the holding unit 11 is provided with three suction pads 14, namely a first suction pad 14A, a second suction pad 14B, and a third suction pad 14C. The holding unit 11 holds an article W by suctioning the article W with one or more or all of the suction pads 14 out of the first suction pad 14A, the second suction pad 14B, and the third suction pad 14C.

As shown in FIG. 4, a first valve 25 (see FIG. 7) and a vacuum generator (not shown) are connected to the first suction pad 14A via a first tube 24. Also, the second suction pad 14B is connected to a second valve 27 (see FIG. 7) and the vacuum generator via a second tube 26. Also, the third suction pad 14C is connected to a third valve 29 (see FIG. 7) and the vacuum generator via a third tube 28 (see FIG. 7).

A transfer control unit H1 (see FIG. 7) for controlling the transfer device 3 controls the first valve 25 such that the state of the first suction pad 14A is switched between a suction state of suctioning the article W and non-suction state of not suctioning the article W. The transfer control unit H1 also controls the second valve 27 such that the state of the second suction pad 14B is switched between the suction state and the non-suction state. The transfer control unit H1 furthermore controls the third valve 29 such that the state of the third suction pad 14C is switched between the suction state and the non-suction state.

As shown in FIG. 5, in an orientation in which the thickness direction of the support portion 13 extends along the vertical direction, the support portion 13 is triangular in a view along the thickness direction of the support portion 13. The support portion 13 supports the first suction pad 14A, the second suction pad 14B, and the third suction pad 14C so as to respectively correspond to three corner portions. The support portion 13 supports the first suction pad 14A, the second suction pad 14B, and the third suction pad 14C such that suction surfaces S thereof face downward, and the first suction pad 14A, the second suction pad 14B, and the third suction pad 14C suction the upward-facing upper surface of the article W.

The holding unit 11 supports the suction pads 14 such that the distance between the first suction pad 14A and the second suction pad 14B, the distance between the first suction pad 14A and the third suction pad 14C, and the distance between the second suction pad 14B and the third suction pad 14C are equivalent distances. The holding unit 11 is shaped as a regular triangle in a view along the thickness direction of the support portion 13, the direction in which any two suction pads 14 are side-by-side is defined as a horizontal direction B, and the direction orthogonal to the horizontal direction B in a view along the thickness direction of the support portion 13 is defined as a vertical direction A. The length of the holding unit 11 in the horizontal direction B is defined as a horizontal length LB, and the length of the holding unit 11 in the vertical direction A is defined as a vertical length LA.

As shown in FIGS. 3 and 6, a stopper 31 that stops the second container C2 transported to the second transport position P2, and an elevator 32 for raising and lowering the second container C2 transported to the second transport position P2 are provided at the second transport position P2.

As shown in FIG. 6, the stopper 31 is raised and lowered between a retracted position of being retracted below the transport surface of the second conveyor 2 (the position indicated by virtual lines in FIG. 6) and a stopping position of projecting upward from the transport surface of the second conveyor 2 (the position indicated by solid lines in FIG. 6). The elevator 32 is raised and lowered between a lowered position of being retracted below the transport surface of the second conveyor 2 (the position indicated by virtual lines in FIG. 6) and a raised position of projecting upward from the transport surface of the second conveyor 2 (the position indicated by solid lines in FIG. 6).

As shown in FIGS. 3 and 6, the elevator 32 is formed such that the height of the upper surface thereof is inclined downward toward the downstream side in the transport direction of the second conveyor 2, and is inclined downward toward one side (the side where the transfer device 3 is present) in the width direction of the second conveyor 2.

The second conveyor 2 includes an inclined conveyor 37, an upstream conveyor 35, and a downstream conveyor 36. The inclined conveyor 37 is disposed at the second transport position P2, and a first transport surface 37A of the inclined conveyor 37 is inclined downward toward the downstream side in the transport direction. The upstream conveyor 35 is disposed adjacent to the inclined conveyor 37 on the upstream side thereof in the transport direction so as to be able to pass the second container C2 to the inclined conveyor 37. The downstream conveyor 36 is disposed adjacent to the inclined conveyor 37 on the downstream side thereof in the transport direction so as to be able to receive the second container C2 from the inclined conveyor 37. A second transport surface 35A, which is the transport surface of the upstream conveyor 35, is located above a third transport surface 36A, which is the transport surface of the downstream conveyor 36, and the second transport surface 35A and the third transport surface 36A are horizontal.

The second conveyor 2 transports the second container C2 to the second transport position P2 in a state where the stopper 31 has been raised to the stopping position and the elevator 32 has been lowered to the lowered position. When the second container C2 is transported to the second transport position P2, the second container C2 is stopped by the stopper 31, and therefore the second container C2 can be located at a position that is appropriate relative to the second transport position P2 in the transport direction of the second conveyor 2.

Then, in the state where the second container C2 is located at the second transport position P2, the elevator 32 is raised from the lowered position to the raised position. Accordingly, the second container C2 can be lifted from the second conveyor 2 by the elevator 32. At this time, the elevator 32 supports the second container C2 in an inclined orientation extending along the upper surface of the elevator 32. Specifically, the elevator 32 supports the second container C2 in an inclined orientation of extending downward toward the first lengthwise side X1 in the lengthwise direction X and extending downward toward the first widthwise side Y1 in the widthwise direction Y, that is to say, the second container C2 supported by the elevator 32 is in an inclined orientation in which the target corner portion 8A, which is one of the four corner portions 8 of the loading portion 6, is located below the other three corner portions 8.

If all the articles W that are to be stored in the second container C2 have been stored therein, the elevator 32 is lowered to the lowered position and the stopper 31 is lowered to the retracted position, and then the second container C2 is transported from the second transport position P2 by the second conveyor 2.

As shown in FIGS. 1 and 3, the articles W each have a rectangular parallelepiped shape in which the outer shape is shaped as a rectangular parallelepiped, and is rectangular in a view along the vertical direction. There are a various types of articles W, and articles W of the same type have the same length, width, and height. Hereinafter, for each article W, out of the two sets of opposing sides on the upper surface, the longer sides will be referred to as the long sides and the shorter sides will be referred to as the short sides, and if the upper surface is a square, one of the two sets of opposing sides will be referred to as the long sides, and the other set of sides will be referred to as the short sides.

Figure 8:
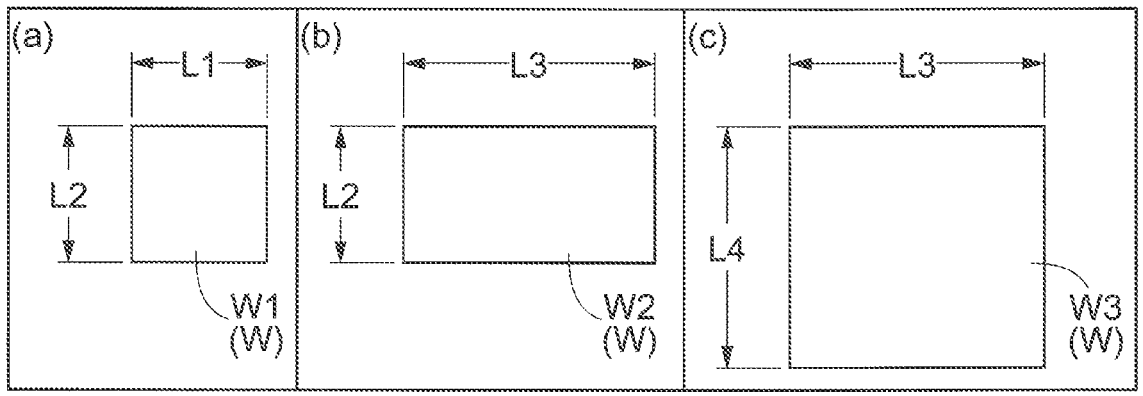
FIG. 8 is a plan view showing a first article, a second article, and a third article.

The articles W are categorized into a first article W1, a second article W2, and a third article W3 according to the size of the upper surface. More specifically, as shown in (a) of FIG. 8, if the long side length of the upper surface of an article W is a first length L1, and the short side length is a second length L2, that article W is the first article W1. Also, as shown in (b) of FIG. 8, if the long side length of the upper surface of an article W is a third length L3, and the short side length is the second length L2, that article W is the second article W2. Also, as shown in (c) of FIG. 8, if the long side length of the upper surface of an article W is the third length L3, and the short side length is a fourth length L4, that article W is the third article W3.

The first length L1 is set shorter than the horizontal length LB of the support portion 13. The second length L2 is set shorter than the vertical length LA of the support portion 13. In the present embodiment, the first length L1 is less than 57 mm, the second length is less than 54 mm, the third length L3 is 57 mm or more, and the fourth length L4 is 54 mm or more. It should be noted that an article W that is too small to be suctioned by one suction pad 14 (an article W whose upper surface short side is less than 30 mm) is not stored in the first container C1.

As shown in FIG. 7, the article loading facility includes a transfer control unit H1, a loading setting unit H2, and an image processing unit H3. The transfer control unit H1 controls the transfer device 3. The loading setting unit H2 sets an arrangement for accommodating one or more articles W in one second container C2. The image processing unit H3 transmits information captured by a first image capturing device 33 and information captured by a second image capturing device 34 to the transfer control unit H1 as captured image information. The control unit H includes the transfer control unit H1 and the loading setting unit H2. The control unit H controls the transfer device 3 such that a plurality of articles W are stored in the second container C2 in accordance with arrangement information that indicates an orientation and a position on the second container C2 for each of the articles W.

The first image capturing device 33 is installed above the upper end of the first container C1 located at the first transport position P1, and is disposed so as to be able to capture images of the first container C1 located at the first transport position P1 and articles W that are stored in that first container C1. The second image capturing device 34 is installed above the upper end of the second container C2 located at the second transport position P2, and is disposed so as to be able to capture images of the second container C2 located at the second transport position P2 and articles W that are stored in that second container C2. Note that the second image capturing device 34 corresponds to an image capturing device that is disposed above the support and captures images of the support and articles W that have already been placed on the support.

Based on arrangement information indicating a loading position and a loading orientation (arrangement) in the second container C2 for each of the articles W that are to be stored in the second container C2, the loading setting unit H2 sequentially selects a target article WT from among the articles W that are to be stored in the second container C2, and transmits information regarding the selected target article WT to the transfer control unit H1. When transmitting information regarding a target article WT to the transfer control unit H1, the loading setting unit H2 transmits type information indicating the type of the target article WT and loading information indicating a loading state (loading position and loading orientation) of the target article WT in the second container C2 to the transfer control unit H1.

The transfer control unit H1 sets in advance holding states in which the holding unit 11 holds the first article W1 and the second article W2 that are in a loading orientation at a loading position.

Figure 9:
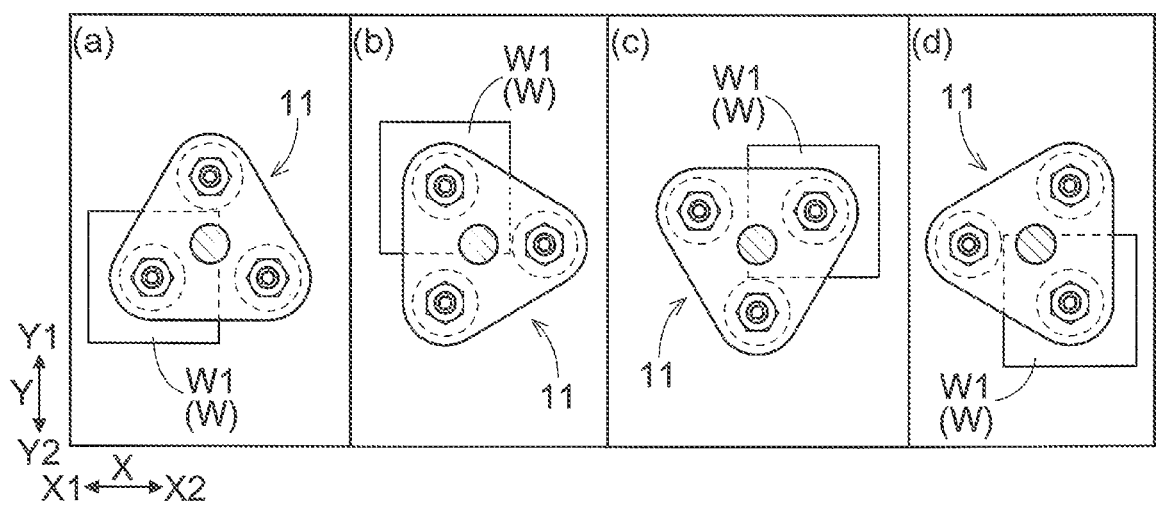
FIG. 9 is a diagram showing holding states for the first article.

Holding states in which the holding unit 11 holds the first article W1 include a first holding state (see (a) in FIG. 9) in which the holding unit 11 projects to the second lengthwise side X2 and the first widthwise side Y1 beyond the first article W1, a second holding state (see (b) in FIG. 9) in which the holding unit 11 projects to the second lengthwise side X2 and the second widthwise side Y2 beyond the first article W1, a third holding state (see (c) in FIG. 9) in which the holding unit 11 projects to the first lengthwise side X1 and the second widthwise side Y2 beyond the first article W1, and a fourth holding state (see (d) in FIG. 9) in which the holding unit 11 projects to the first lengthwise side X1 and the first widthwise side Y1 beyond the first article W1. Note that the holding states of the holding unit 11 relative to the first article W1 are set regardless of the direction along which the long side of the first article W1 extends.

Figure 10:
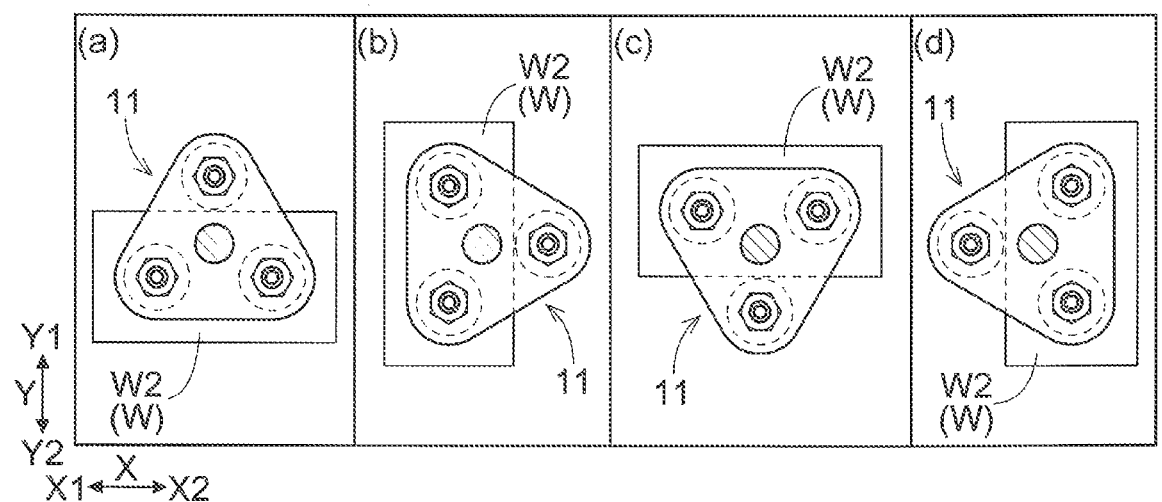
FIG. 10 is a diagram showing holding states for the second article.
Figure 11:
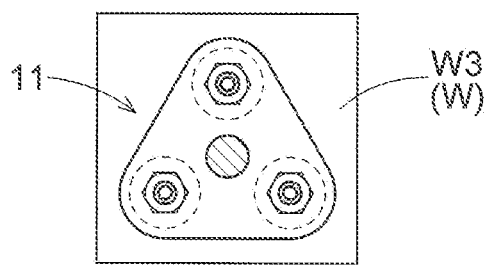
FIG. 11 is a diagram showing holding states for the third article.
Figure 12:
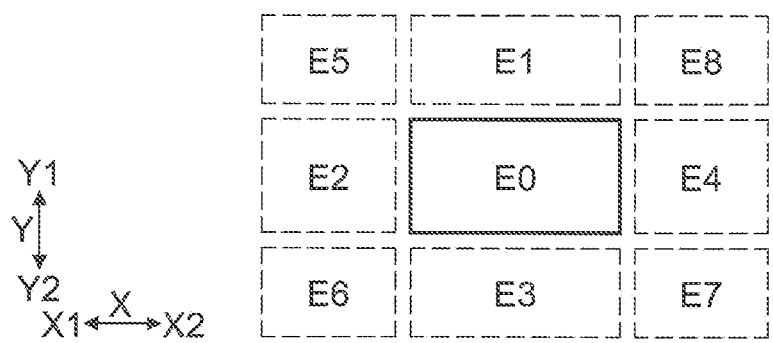
FIG. 12 is a diagram showing a loading area and the surrounding area.

Also, holding states in which the holding unit 11 holds the second article W2 include a fifth holding state (see (a) in FIG. 10) in which the holding unit 11 projects to the first widthwise side Y1 beyond the second article W2 whose long side extends along the lengthwise direction X, a sixth holding state (see (b) in FIG. 10) in which the holding unit 11 projects to the second lengthwise side X2 beyond the second article W2 whose long side extends along the widthwise direction Y, a seventh holding state (see (c) in FIG. 10) in which the holding unit 11 projects to the second widthwise side Y2 beyond the second article W2 whose long side extends along the lengthwise direction X, and an eighth holding state (see (d) in FIG. 10) in which the holding unit 11 projects to the first lengthwise side X1 beyond the second article W2 whose long side extends along the widthwise direction Y. Also, a ninth holding state (see FIG. 11) in which the holding unit 11 does not project beyond the third article W3 is set as a holding state in which the holding unit 11 holds the third article W3.

In the first to fourth holding states, one of the three suction pads 14 provided on the holding unit 11 is suctioned to the first article W1. In the present embodiment, the one suction pad 14 that is to suction the first article W1 is selected from among the three suction pads 14 according to the orientation of the holding unit 11 before suctioning the first article W1, the position of the first article W1 with respect to the second container C2 when the article W1 was loaded in the loaded orientation at the loading position in the second container C2, and the surroundings of the loading position. Specifically, for example, in the case of suctioning the first article W1 stored in the first container C1 and loading the first article W1 in the loading orientation at the loading position in the second container C2, the suction pad 14 that results in the smallest amount of rotation of the holding unit 11 is selected.

In the fifth to eighth holding states, two of the three suction pads 14 provided on the holding unit 11 are suctioned to the second article W2. In the present embodiment, the two suction pads 14 that are to be suctioned to the second article W2 are selected from among the three suction pads 14 similarly to the case of selecting the one suction pad 14 that is to be suctioned to the first article W1.

Note that the first article W1 may be suctioned by one preset suction pad 14 in the first to fourth holding states, and the second article W2 may be suctioned by two preset suction pads 14 in the fifth to eighth holding states.

In the case where the target article WT is held by the holding unit 11 in preset holding states as described above, when holding the first article W1, the holding unit 11 projects horizontally beyond two of the four sides that form the periphery of the upper surface; when holding the second article W2, the holding unit 11 projects horizontally beyond one of the four sides that form the periphery of the upper surface; and when holding the third article W3, the holding unit 11 does not project horizontally beyond the upper surface. In this way, the target article WT is held by the holding unit 11 such that the holding unit 11 projects from the smallest number of sides among the four sides that form the periphery of the upper surface of the target article WT.

When there are a plurality of articles W that are to be stored in the second container C2, in the case of an article W for which information has already been transmitted to the transfer control unit H1 as a target article WT, the loading setting unit H2 determines that article W to be a loaded article WA that is already stored in the second container C2, and sets a loading state as the state of the loaded article WA on the assumption that the loaded article WA has been loaded based on the preset arrangement information. Then, based on the loading state, the loading setting unit H2 determines a loading position and a loading orientation in the second container C2 for the article W that is to be the next target article WT. In this way, the loading setting unit H2 acquires a loading state based on preset arrangement information.

The loading setting unit H2 determines a loading position and a loading orientation in the arrangement information such that a target article WT comes into contact with the side wall portion 7 or a loaded article WA from the side opposite to the target corner portion 8A side. Specifically, the loading position and the loading orientation are set such that, in the case where the target article WT is stored in the second container C2 in the loading orientation at the loading position, out of the pair of side surfaces of the target article WT that face the lengthwise direction X, at least a portion of the side surface that faces the target corner portion 8A side (first lengthwise side X1) comes into contact with the side wall portion 7 or the loaded article WA, and furthermore out of the pair of side surfaces of the target article WT that face the widthwise direction Y, at least a portion of the side surface that faces the target corner portion 8A side (first widthwise side Y1) comes into contact with the side wall portion 7 or the loaded article WA.

The loading setting unit H2 executes setting control such that, based on the loading position and the loading orientation determined for a target article WT, a loading area E0 for placement of the target article WT is set on the upper surface of the loading portion 6 of the second container C2 or the upper surface of a loaded article WA. This loading area E0 corresponds to the loading surface region on which the target article is to be placed. The loading area E0 is a region that is larger on the second lengthwise side X2 and the second widthwise side Y2 than the region where the article W at the loading position is placed (the region that overlaps the article W at the loading position in a view along the vertical direction Z) by a set amount. Also, the loading setting unit H2 acquires height information regarding the second container C2 and loaded articles WA around the loading area E0 based on the loading state of the loaded articles WA.

The transfer control unit H1 acquires height information regarding the second container C2 and loaded articles WA around the loading area E0 from the loading setting unit H2, and executes projection determination to determine a projectable area based on the acquired height information.

Specifically, the transfer control unit H1 divides the area surrounding the loading area E0 into first to eighth areas E1 to E8, and acquires height information regarding loaded articles WA and the second container C2.

The first area E1 is set so as to be adjacent to the loading area E0 on the first widthwise side Y1. The second area E2 is set so as to be adjacent to the loading area E0 on the first lengthwise side X1. The third area E3 is set so as to be adjacent to the loading area E0 on the second widthwise side Y2. The fourth area E4 is set so as to be adjacent to the loading area E0 on the second lengthwise side X2. The fifth area E5 is set so as to be adjacent to the first area E1 on the first lengthwise side X1 and adjacent to the second area E2 on the first widthwise side Y1. The sixth area E6 is set so as to be adjacent to the second area E2 on the second widthwise side Y2 and adjacent to the third area E3 on the first lengthwise side X1. The seventh area E7 is set so as to be adjacent to the third area E3 on the second lengthwise side X2 and adjacent to the fourth area E4 on the second widthwise side Y2 side. The eight area E8 is set so as to be adjacent to the fourth area E4 on the first widthwise side Y1 and adjacent to the first area E1 on the second lengthwise side X2.

The transfer control unit H1 acquires height information for each of the first to eight areas E1 to E8 based on the loading state. More specifically, if the side wall portion 7 of the second container C2 is present in an area, the height of the side wall portion 7 is set as the height of that area. If the side wall portion 7 is not present in an area but a loaded article WA is present, the height of the loaded article WA is set as the height of that area. Note that if there are a plurality of loaded articles WA in an area, the height of the loaded article WA having the highest height among the plurality of loaded articles WA is set as the height of the area, and if a plurality of loaded articles WA are stacked, the total height of the loaded articles WA is set as the height of the area. If neither the side wall portion 7 nor a loaded article WA is present in an area, the height of the loading portion 6 is set as the height of that area.

Specifically, the heights of the first to eighth areas E1 to E8 are set as follows. Note that in FIG. 14, the loaded article WA located in the first area E1 and the eighth area E8 will be referred to as a first loaded article WA1. Also, in FIG. 15, the loaded article WA located in the first area E1, the fifth area E5, and the eighth area E8 will be referred to as a second loaded article WA2, the loaded article WA located in the second area E2 and the sixth area E6 will be referred to as a third loaded article WA3, and the loaded article WA located in the fourth area E4 and the eighth area E8 will be referred to as a fourth loaded article WA4. In the present embodiment, out of the second loaded article WA2 and the third loaded article WA3, the third loaded article WA3 is lower, and out of the third loaded article WA3 and the fourth loaded article WA4, the fourth loaded article WA4 is lower. Also, in the present embodiment, the height of the side wall portion 7 is set to a height higher than the actual side wall portion 7 (e.g., height∞mm).

Figure 13:
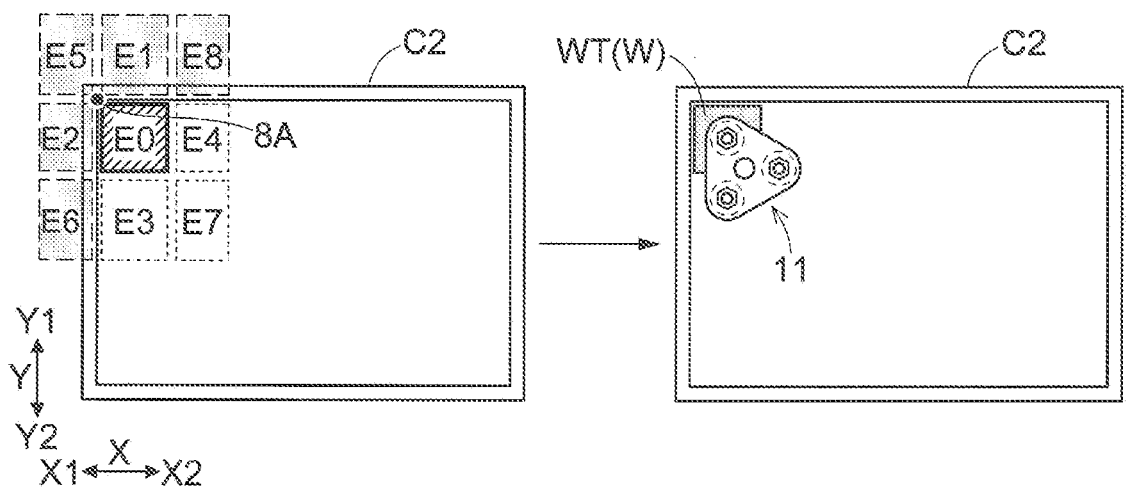
FIG. 13 is a diagram showing a state in which a target article held in a second holding state is transferred to a loading position.

In the case of the loading state in the second container C2 and the state of the loading area E0 shown in FIG. 13, the heights of the first area E1, the second area E2, the fifth area E5, the sixth area E6, and the eighth area E8 are set to the height of the side wall portion 7 of the second container C2. Also, the heights of the third area E3, the fourth area E4, and the seventh area E7 are set to the height of the loading portion 6 (height 0 mm).

In the case of the loading state in the second container C2 and the state of the loading area E0 shown in FIG. 14, the heights of the first area E1 and the eighth area E8 are set to the sum of the height of the loading portion 6 and the height of the first loaded article WA1. Also, the heights of the second area E2, the third area E3, the fifth area E5, the sixth area E6, and the seventh area E7, are set to the height of the side wall portion 7 of the second container C2. The height of the fourth area E4 is set to the height of the loading portion 6.

In the case of the loading state in the second container C2 and the state of the loading area E0 shown in FIG. 15, the heights of the first area E1, the fifth area E5, and the eighth area E8 are set to the sum of the height of the loading portion 6 and the height the second loaded article WA2. Also, the heights of the second area E2 and the sixth area E6 are set to the sum of the height of the loading portion 6 and the height of the third loaded article WA3. The heights of the third area E3 and the seventh area E7 are set to the height of the loading portion 6. Also, the height of the fourth area E4 is set to the sum of the height of the loading portion 6 and the height of the fourth loaded article WA4.

The transfer control unit H1 determines the projectable area based on the height information indicating the heights of the first to eighth areas E1 to E8.

The transfer control unit H1 determines a first projectable area to be the area having a lower height between the first area E1 and the third area E3. Also, a second projectable area is determined to be the area having a lower height between the second area E2 and the fourth area E4.

Also, in the case of a fifth area E5 group (the fifth area E5 as well as the first area E1 and the second area E2 that are adjacent to the fifth area E5), the transfer control unit H1 sets the highest height among the heights set for the three areas that make up the fifth area E5 group as the height of the fifth area E5 group. Specifically, if the height set for the fifth area E5 is the highest among the heights set for the fifth area E5, the first area E1, and the second area E2, then the height of the fifth area E5 is set as the height of the fifth area E5 group. In the case of a sixth area E6 group (the sixth area E6 as well as the second area E2 and third area E3 that are adjacent to the sixth area E6), a seventh area E7 group (the seventh area E7 as well as the third area E3 and the fourth area E4 that are adjacent to the seventh area E7), and an eighth area E8 group (the eighth area E8 as well as the fourth area E4 and the first area E1 that are adjacent to the eighth area E8), the height of the area group is set similar to the aforementioned fifth area E5 group. A third projectable area is then determined to be the area group that has the lowest height among the fifth area E5 group, the sixth area E6 group, the seventh area E7 group, and the eighth area E8 group.

Specifically, in the loading state in the second container C2 and the state of the loading area E0 shown in FIG. 13, the projectable area is determined as follows. Specifically, out of the first area E1 having the height of the side wall portion 7 and the third area E3 having the height of the loading portion 6, the third area E3 having the lowest height is determined to be the first projectable area. Out of the second area E2 having the height of the side wall portion 7 and the fourth area E4 having the height of the loading portion 6, the fourth area E4 having the lowest height is determined to be the second projectable area. Out of the fifth area E5 group, the sixth area E6 group, and the eighth area E8 group that have the height of the side wall portion 7, and the seventh area E7 group having the height of the loading portion 6, the seventh area E7 group having the lowest height is determined to be the third projectable area.

Also, in the loading state in the second container C2 and the state of the loading area E0 shown in FIG. 14, the projectable area is determined as follows. Specifically, out of the first area E1 having the height of the first loaded article WA1 and the third area E3 having the height of the side wall portion 7, the first area E1 having the lowest height is determined to be the first projectable area. Out of the second area E2 having the height of the side wall portion 7 and the fourth area E4 having the height of the loading portion 6, the fourth area E4 having the lowest height is determined to be the second projectable area. Out of the fifth area E5 group, the sixth area E6 group, and the seventh area E7 group that have the height of the side wall portion 7, and the eighth area E8 group having the height of the first loaded article WA1, the eighth area E8 group having the lowest height is determined to be the third projectable area.

Also, in the loading state in the second container C2 and the state of the loading area E0 shown in FIG. 15, the projectable area is determined as follows. Specifically, out of the first area E1 having the height of the second loaded article WA2 and the third area E3 having the height of the loading portion 6, the third area E3 having the lowest height is determined to be the first projectable area. Out of the second area E2 having the height of the third loaded article WA3 and the fourth area E4 having the height of the fourth loaded article WA4, the fourth area E4 having the lowest height is determined to be the second projectable area. Out of the fifth area E5 group and the eighth area E8 group having the height of the second loaded article WA2, the sixth area E6 group having the height of the third loaded article WA3, and the seventh area E7 group having the height of the fourth loaded article WA4, the seventh area E7 group having the lowest height is determined to be the third projectable area. Note that if the third loaded article WA3 were the lowest among the second loaded article WA2, the third loaded article WA3, and the fourth loaded article WA4, then the sixth area E6 group would be determined to the third projectable area.

The height of the area determined to be the projectable area by the transfer control unit H1 is sometimes lower than the upper surface of the target article WT positioned in the loading orientation at the loading position, and is sometimes higher than the upper surface of the target article WT positioned in the loading orientation at the loading position. However, due to the transfer control unit H1 determining the projectable area as described above, the transfer control unit H1 determines that the projectable area is an area in which the height around the loading position is lower than the upper surface of the target article WT positioned in the loading orientation at the loading position, or if such an area does not exist, the area with the lowest height around the loading position.

If the target article WT is the second article W2 and the loading orientation is an orientation in which the long side of the target article WT extends along the lengthwise direction X, the transfer control unit H1 sets the holding state for the holding unit 11 to hold the target article WT in accordance with the determination of the first projectable area. Specifically, if the first projectable area is the first area E1, the holding state is set to the fifth holding state (see (a) in FIG. 10), and if the first projectable area is the third area E3, the holding state is set to the seventh holding state (see (c) in FIG. 10).

Also, if the target article WT is the second article W2 and the loading orientation is an orientation in which the long side of the target article WT extends along the widthwise direction Y, the transfer control unit H1 sets the holding state for the holding unit 11 to hold the target article WT in accordance with the determination of the second projectable area. Specifically, if the second projectable area is the fourth area E4, the holding state is set to the sixth holding state (see (b) in FIG. 10), and if the second projectable area is the second area E2, the holding state is set to the eighth holding state (see (d) in FIG. 10).

Also, if the target article WT is the first article W1, the transfer control unit H1 sets the holding state for the holding unit 11 to hold the target article WT in accordance with the determination of the third projectable area. Specifically, if the third projectable area is the eighth area E8 group, the holding state is set to the first holding state (see (a) in FIG. 9), if the third projectable area is the seventh area E7 group, the holding state is set to the second holding state (see (b) in FIG. 9), if the third projectable area is the sixth area E6 group, the holding state is set to the third holding state (see (c) in FIG. 9), and if the third projectable area is the fifth area E5 group, the holding state is set to the fourth holding state (see (d) in FIG. 9).

Also, if the target article WT is the third article W3, the transfer control unit H1 sets the holding state for the holding unit 11 to hold the target article WT to the ninth holding state.

Figure 26:
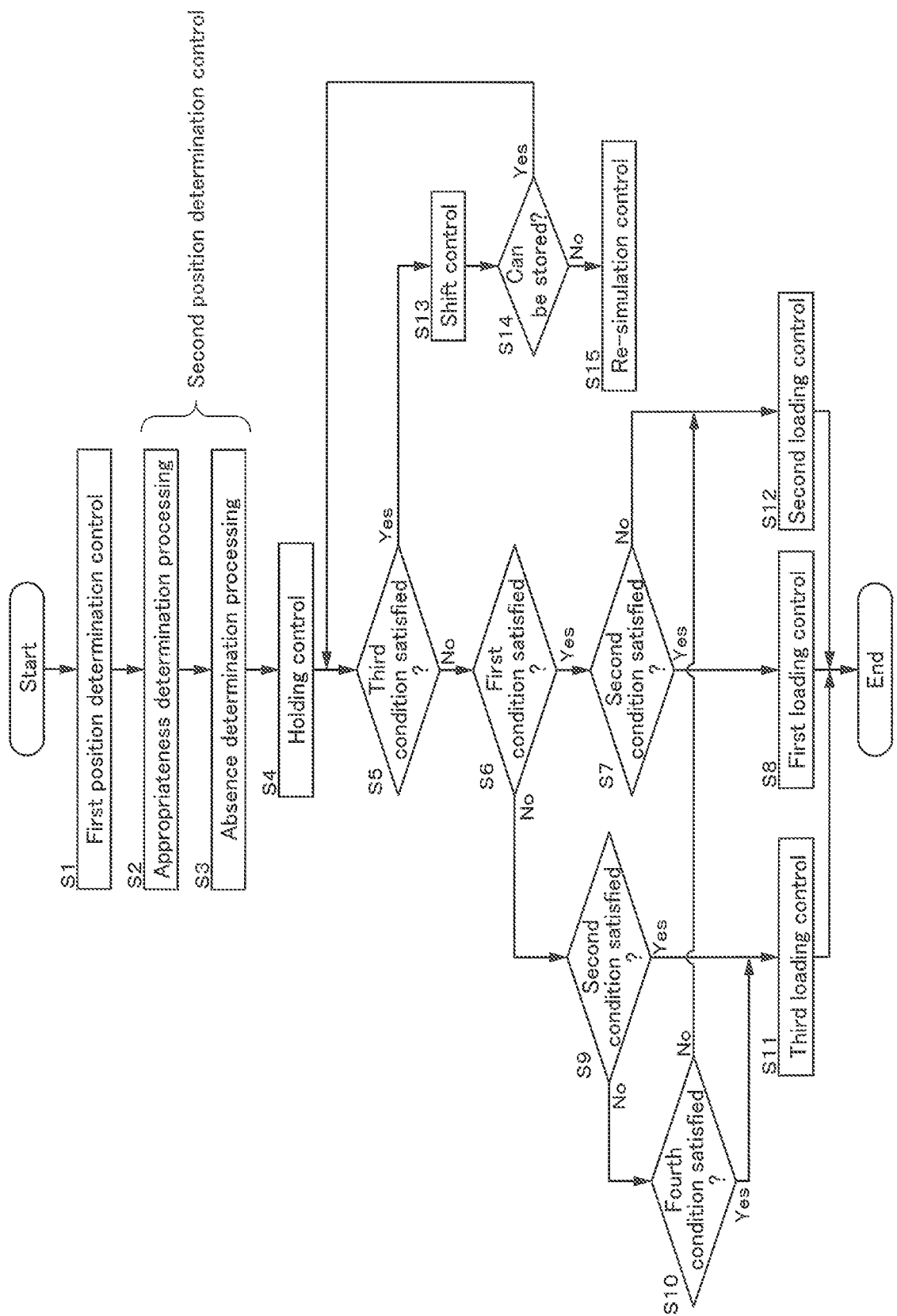
FIG. 26 is a control flowchart in the case where a target article is transferred.

As shown in FIG. 26, the transfer control unit H1 executes first position determination control (S1), second position determination control (S2, S3), holding control (S4), loading control (first loading control (S8), second loading control (S12), and third loading control (S11)). The first position determination control, the second position determination control, and the holding control are executed each time the target article WT is transferred from the first container C1 to the second container C2. Only one loading control selected from among the first loading control, the second loading control, and the third loading control is executed each time the target article WT is transferred from the first container C1 to the second container C2. The holding control is executed after the first position determination control, and the loading control is executed after the second position determination control and the holding control. The first position determination control and the second position determination control may be executed at the same time or sequentially. In the present embodiment, the first position determination control and the second position determination control are executed in the order of first the first position determination control and then the second position determination control, before the holding control.

First Position Determination Control

The first position determination control is control for determining the position of the side wall portion 7 of the first container C1 located at the first transport position P1 and the orientations and the positions of articles W stored in the first container C1, based on captured image information obtained by the first image capturing device 33.

Holding Control

The transfer control unit H1 receives not only the type information and loading information regarding the target article WT, but also receives height information indicating a height A1 of the projectable area from the loading setting unit H2. The holding control is executed based on the type information, information indicating the orientations and positions of the articles W determined by the first position determination control, and the height information of the projectable area.

More specifically, in the holding control, the transfer device 3 is controlled based on the information indicating the orientations and positions of the articles W determined by the first position determination control such that the target article WT stored in the first container C1 is held by the holding unit 11 in the holding state indicated by holding information in the case where the target article WT is positioned in the loading orientation at the loading position in the second container C2. Here, the holding information is information that indicates a holding state for the holding unit 11 to hold the target article WT.

In this way, in the case where the target article WT stored in the first container C1 is to be held by the holding unit 11, if the holding unit 11 has a projecting portion that projects laterally beyond the target article WT, the transfer control unit H1 executes the holding control for holding the target article WT such that the projecting portion is located in the projectable area when the target article WT is positioned in the loading orientation at the loading position in a view along the vertical direction Z of the container. By holding the target article WT based on the holding information as described above, in the holding control, the target article WT is held such that the holding unit 11 projects from the smallest number of sides among the sides that form the periphery of the upper surface of the target article WT.

Second Position Determination Control

In the second position determination control, appropriateness determination processing and absence determination processing are executed.

In the appropriateness determination processing, based on captured image information obtained by the second image capturing device 34 at a time that is after the target article WT, which is one of the articles W, was stored in the second container C2 and is before the subsequent article W after the target article WT is stored in the second container C2, it is determined whether or not the position of the target article WT stored in the second container C2 is appropriate with respect to the position and the orientation indicated in the arrangement information. The transfer control unit H1 stores the result of the appropriateness determination processing. Note that the appropriateness determination processing corresponds to appropriateness determination control for determining whether or not the position of the target article WT placed on the support is appropriate with respect to the position and orientation indicated in the arrangement information.

The following further describes the appropriateness determination processing.

The appropriateness determination processing is processing for determining the position of a loaded article WA that is stored in the second container C2. In this appropriateness determination processing, it is determined whether or not the loaded article WA stored in the second container C2 has been placed appropriately with respect to the position and orientation indicated by the arrangement information.

Specifically, in the appropriateness determination processing, in the case where the entire upper surface of the loaded article WA stored in the second container C2 is included in the captured image information (see FIGS. 19 to 21), if the amount of deviation of the loaded article WA from the position and orientation indicated by the arrangement information is less than or equal to a preset set amount, the loaded article WA is determined to be an appropriate loaded article WA5.

In the appropriateness determination processing, even in the case where at least a portion of the upper surface of the loaded article WA stored in the second container C2 is not included in the captured image information due to a blind spot of the second image capturing device 34 caused by the presence of another loaded article WA stored in the second container C2 (see FIGS. 22 to 24), if an edge portion of the upper surface of the loaded article WA is included in the captured image information and the edge portion of the upper surface of the article WA matches the position of the article W indicated by the arrangement information (the amount of deviation is less than or equal to the preset set amount), the loaded article WA is determined to be an appropriate loaded article WA5.

Figure 25:
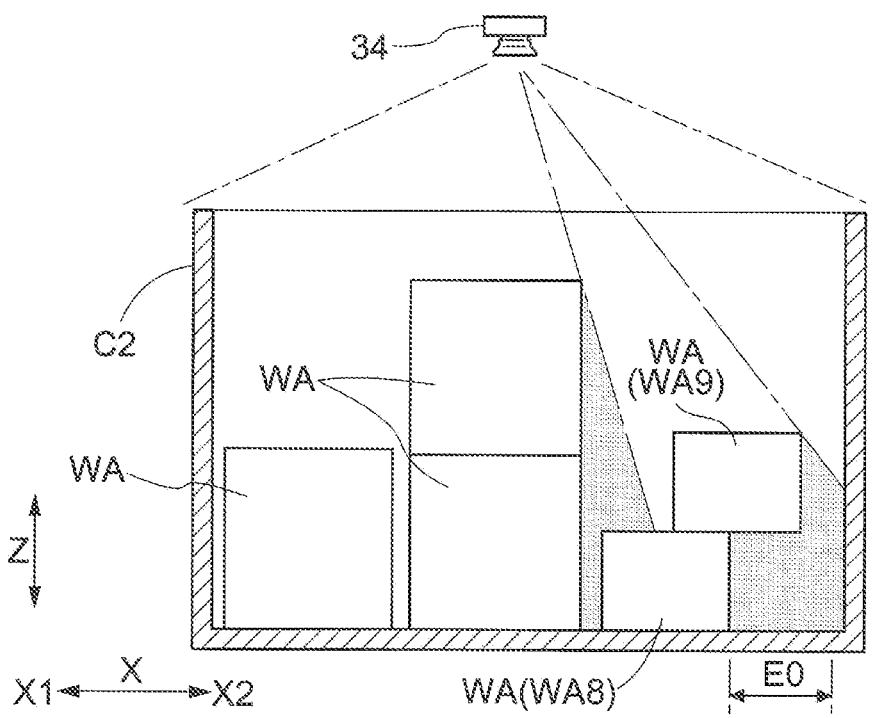
FIG. 25 is a diagram showing a state in which shift control is executed.

In the appropriateness determination processing, in the case where the entire upper surface of the loaded article WA stored in the second container C2 is included in the captured image information, if the amount of deviation of the loaded article WA from the position and orientation indicated by the arrangement information exceeds the set amount, the loaded article WA is determined to be an inappropriate loaded article WA9 (see FIG. 25).

In the appropriateness determination processing, in the case where at least a portion of the upper surface of the loaded article WA stored in the second container C2 is not included in the captured image information, but an edge portion of the upper surface of the loaded article WA is included in the captured image information, if the edge portion of the upper surface of the loaded article WA does not match the position of the article W shown in the arrangement information (the amount of deviation exceeds the preset set amount), the loaded article WA is determined to be an inappropriate loaded article WA9.

In the appropriateness determination processing, if the entire upper surface of the loaded article WA that was stored in the second container C2 immediately before the target article WT is not included in the captured image information, the loaded article WA is determined to be an uncertain loaded article WAx (not shown).

The transfer control unit H1 then stores the result of the appropriateness determination processing. Specifically, when the transfer control unit H1 stores the result of the appropriateness determination processing, the appropriate loaded article WA5 is stored as a past appropriate loaded article WA6, the inappropriate loaded article WA9 is stored as a past inappropriate loaded article WA8, and the uncertain loaded article WAx is stored as a past uncertain loaded article WA7.

The following describes the absence determination processing.

In the absence determination processing, based on the orientation and position of the loaded article WA determined in the appropriateness determination processing, it is determined whether a loaded article WA is not present above the loading area E0, a loaded article WA is present above the loading area E0, or it is uncertain whether a loaded article WA is not present above the loading area E0.

Specifically, in the absence determination processing, if the entire upper surface of the loading area E0 appears based on the captured image information obtained by the second image capturing device 34, it is determined that a loaded article WA is not present above the loading area E0. Then, in the absence determination processing, based on the captured image information captured by the second image capturing device 34, if a portion of the loading area E0 does not appear because a loaded article WA is present in the loading area E0, it is determined that a loaded article WA is present above the loading area E0.

Also, even in the case where a portion of the loading area E0 is not included in the captured image information because a portion of the loading area E0 is in a blind spot of the second image capturing device 34, if all of the loaded articles WA located around the loading area E0 (the loaded articles WA located in the first to eighth areas E1 to E8) are appropriate loaded articles WA5 or past appropriate loaded articles WA6, it is determined that a loaded article WA is not present above the loading area E0. Note that "a portion of the loading area E0 is not included in the captured image information" is intended to mean that at least a portion of the loading area E0 is not included in the captured image information, and also includes the case where no portion of the loading area E0 is included in the captured image information.

Also, in the absence determination processing, if at least one of the loaded articles WA located around the loading area E0 is an inappropriate loaded article WA9, it is determined that a loaded article WA is present above the loading area E0.

On the other hand, in the absence determination processing, in the case where a portion of the loading area E0 is not included in the captured image information due to a portion of the loading area E0 being in a blind spot of the second image capturing device 34, if at least one of the loaded articles WA located around the loading area E0 is an uncertain loaded article WAx, a past inappropriate loaded article WA8, or a past uncertain loaded article WA7, it is determined to be uncertain whether a loaded article WA is not present above the loading area E0.

If it was determined that it is uncertain whether a loaded article WA is not present above the loading area E0, the loaded article having the highest upper surface position is selected from among the uncertain loaded articles WAx, the past inappropriate loaded articles WA8, and the past uncertain loaded articles WA7, and the height of the upper surface of the selected loaded article WA is set as an indeterminate height A4. The indeterminate height A4 is the height of the upper surface of a loaded article WA that is possibly present above the loading area E0, and corresponds to a height at which it is uncertain whether a loaded article WA is not present in the loading area E0.

In this way, in the absence determination processing, if the entire upper surface of the loading area E0 appears based on the captured image information captured by the second image capturing device 34, it is determined that a loaded article WA is not present above the loading area E0. If it was determined that a loaded article WA is not present above the loading area E0, the transfer control unit H1 executes the first loading control. As will be described later, in the present embodiment, in the case where it was determined that a loaded article WA is not present above the loading area E0, if the height A1 of the projectable area is lower than the sum of the height A2 of the upper surface of the loading area E0, the height of the target article WT, and a third specified distance D3, then the transfer control unit H1 executes the first loading control, whereas if the condition regarding the height A1 is not satisfied, the transfer control unit H1 executes the third loading control. Also, in the absence determination processing, if a portion of the loading area E0 is not included in the captured image information due to the presence of a loaded article WA above the loading area E0, or if at least one of the loaded articles WA around the loading area E0 is an inappropriate loaded article WA9, it is determined that a loaded article WA is present above the loading area E0.

On the other hand, in the absence determination processing, if a portion of the loading area E0 is not included in the captured image information due to a portion of the loading area E0 being in a blind spot of the second image capturing device 34, it is determined that it is uncertain whether a loaded article WA is not present in the loading area E0. If it was determined that it is uncertain whether a loaded article WA is not present in the loading area E0, the transfer control unit H1 executes the second loading control. As will be described later, in the present embodiment, in the case where it was determined that it is uncertain whether a loaded article WA is not present in the loading area E0, if a later-described fourth condition is not satisfied, the transfer control unit H1 executes the second loading control, whereas if the fourth condition is satisfied, the transfer control unit H1 executes the third loading control.

Note that, even in the case where a portion of the loading area E0 is not included in the captured image information due to a portion of the loading area E0 being in a blind spot of the second image capturing device 34, if an edge portion of the upper surface of a loaded article WA that is forming the blind spot is included in the captured image information and the edge portion of the upper surface of the blind-spot-forming article matches the position of the article W shown in the arrangement information, it is determined that a loaded article WA is not present above the loading area E0.

Also, even in the case where a portion of the loading area E0 is not included in the captured image information due to a portion of the loading area E0 being in a blind spot of the second image capturing device 34, if it was determined that the position of a loaded article WA located around the loading area E0 (a surrounding article) is appropriate in the appropriateness determination control, it is determined that a loaded article WA is not present above the loading area E0. Note that a blind-spot-forming article is, among the loaded articles WA in the surrounding area, a loaded article WA that does not have another loaded article WA placed on the upper surface and that forms a blind spot in the loading area E0.

Loading Control

As shown in FIG. 26, when the transfer control unit H1 executes loading control, the first loading control is executed if a third condition is not satisfied but a first condition and a second condition are satisfied (S5, S6, S7, S8), the third loading control is executed if the first condition and the third condition are not satisfied but the second condition is satisfied (S5, S6, S9, S11), and the second loading control is executed if the second condition and the third condition are not satisfied but the first condition is satisfied (S5, S6, S7, S12). In the case where the first condition, the second condition, and the third condition are all not satisfied, the transfer control unit H1 executes the third loading control if a fourth condition is satisfied (S5, S6, S9, S10, S11), and executes the second loading control if the fourth condition is not satisfied (S5, S6, S9, S10, S12). Also, if the third condition is satisfied, the transfer control unit H1 executes shift control for setting a new loading area E0 capable of storing the target article WT (S5, S13). If it is determined that a new loading area E0 cannot be set in the shift control (the target article WT cannot be stored), re-simulation control is executed (S14, S15).

Figure 16:
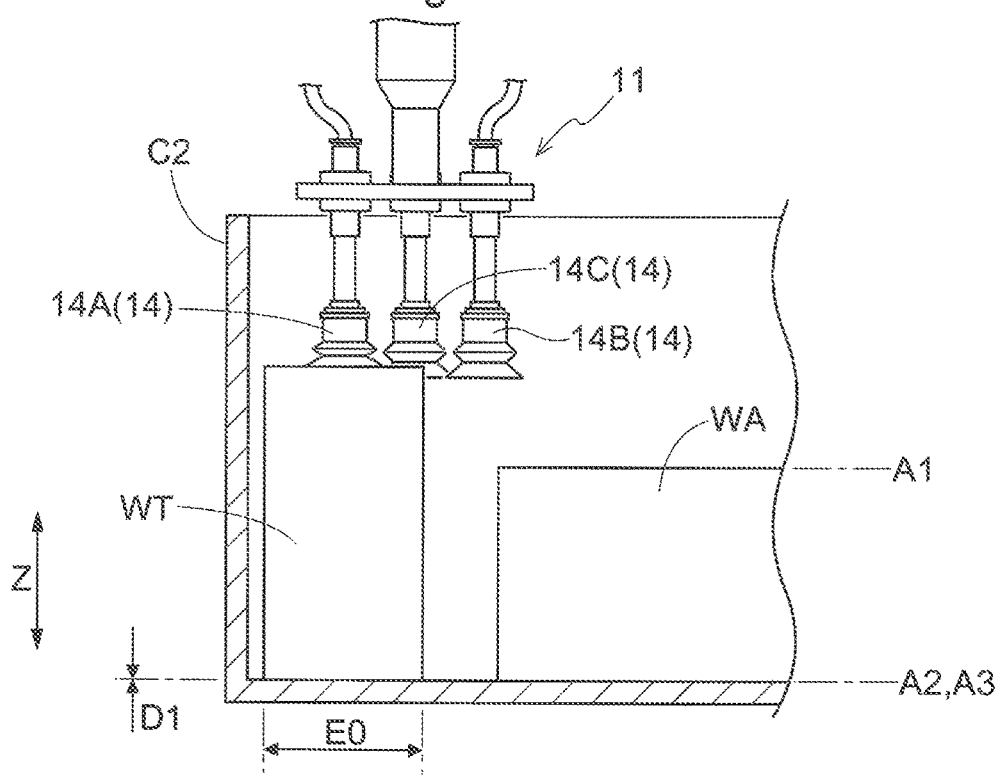
FIG. 16 is a diagram showing a state in which a target article is transferred according to first loading control.

The first condition is that, as shown in FIG. 16 for example, in a state where the target article WT is positioned at a loading preparation position described later, the holding unit 11 is overlapped with a loaded article WA located around the loading area E0 in a view along the vertical direction Z, and the height A1 of the projectable area (the height of the upper surface of the loaded article WA in FIG. 16) is lower than the sum of the height A2 of the upper surface of the loading area E0, the height of the target article WT, and the third specified distance D3.

The second condition is that, in the absence determination processing, it was determined that a loaded article WA is not present above the loading area E0.

The third condition is that, in the absence determination processing, it was determined that a loaded article WA is present above the loading area E0.

Accordingly, if it was determined in the absence determination processing that it is uncertain whether a loaded article WA is not present above the loading area E0, the second condition and the third condition are both not satisfied.

The fourth condition is that, when the sum of the indeterminate height A4 and a second specified distance D2 (the height A3 of the lower surface of the target article WT in the case of executing the second loading control) is compared with the height A3 of the lower surface of the target article WT being held by the holding unit 11 in the case where the lower surface of the holding unit 11 is at a position that is the third specified distance D3 higher than the height A1 of the projectable area (the height A3 of the lower surface of the target article WT in the case of executing the third loading control), the height A3 of the lower surface of the target article WT in the case of executing the third loading control is higher.

The first loading control is control for storing the target article WT in the second container C2 by causing the holding unit 11 to release the target article WT at a position at which the target article WT is directly above the loading area E0 and furthermore the lower surface of the target article WT is higher than the upper surface of the loading area E0 by a first specified distance D1. In the present embodiment, the first specified distance D1 is set to 0 mm.

The second loading control is control for storing the target article WT in the second container C2 by causing the holding unit 11 to release the target article WT at a position at which the target article WT is directly above the loading area E0 and furthermore the height A3 of the lower surface of the target article WT is higher than the indeterminate height A4 by the second specified distance D2. In the present embodiment, the second specified distance D2 is set to several millimeters (e.g., 3 to 4 mm).

The third loading control is control for storing the target article WT in the second container C2 by causing the holding unit 11 to release the target article WT at a position at which the target article WT is directly above the loading area E0 and furthermore the lower surface of the holding unit 11 (the lower surface of the suction pad 14) is higher than the height A1 of the projectable area by the third specified distance D3. In the present embodiment, the third specified distance D3 is set to several millimeters (e.g., 3 to 4 mm), and is set to the same distance as the second specified distance D2.

The shift control is control for setting a new loading area E0 on which the target article WT can be loaded on the upper surface of the loading portion 6 of the second container C2 or the upper surface of a loaded article WA, based on the orientations and positions of loaded articles WA stored in the second container C2 in the current state, which is determined based on the captured image information obtained by the second image capturing device 34.

The re-simulation control is a control for ending loading in the current second container C2 in the current state and creating new arrangement information according to which the remaining articles W that were to be stored in the current second container C2 will be stored in the new second container C2.

The following is a further description of loading control. When the first loading control, the second loading control, and the third loading control are to be executed, a loading preparation position is set. This loading preparation position is set as a position that is a set distance toward the second lengthwise side X2 from the loading position in the loading area E0 in the lengthwise direction X, is on the second widthwise side Y2 of the loading position in the loading area E0 in the widthwise direction Y, and is a set distance higher than the loading area E0 in the vertical direction Z (the lower surface of the target article WT is higher than the side wall portion 7).

In the first loading control, the holding unit 11 is moved such that the target article WT is positioned in the loading orientation at the loading preparation position, then the holding unit 11 is lowered such that the height A3 of the lower surface of the target article WT is higher than the height A2 of the upper surface of the loading area E0 by the first specified distance D1, then the holding unit 11 is moved toward the first lengthwise side X1 and the first widthwise side Y1 such that the target article WT is located directly above the loading position, and then the holding unit 11 is caused to release the target article WT such that the target article WT is transferred to the loading position.

In the second loading control, the holding unit 11 is moved such that the target article WT is positioned in the loading orientation at the loading preparation position, then the holding unit 11 is lowered such that the height A3 of the lower surface of the target article WT is higher than the indeterminate height A4 set in the absence determination processing by the second specified distance D2, then the holding unit 11 is moved toward the first lengthwise side X1 and the first widthwise side Y1 such that the target article WT is located directly above the loading position, and then the holding unit 11 is caused to release the target article WT such that the target article WT is transferred to the loading position.

In the third loading control, the holding unit 11 is moved such that the target article WT is positioned in the loading orientation at the loading preparation position, then the holding unit 11 is lowered such that the position of the lower surface of the holding unit 11 is higher than the height A1 of the projectable area by the third specified distance D3, then the holding unit 11 is moved toward the first lengthwise side X1 and the first widthwise side Y1 such that the target article WT is located directly above the loading position, and then the holding unit 11 is caused to release the target article WT such that the target article WT is transferred to the loading position.

The following describes specific examples of a case where the first loading control is executed, a case where the second loading control is executed, and a case where the third loading control is executed. These types of loading control will be described taking the example of a case where only the loaded articles WA shown in FIGS. 16 to 25 are stored around the loading area E0.

Figure 17:
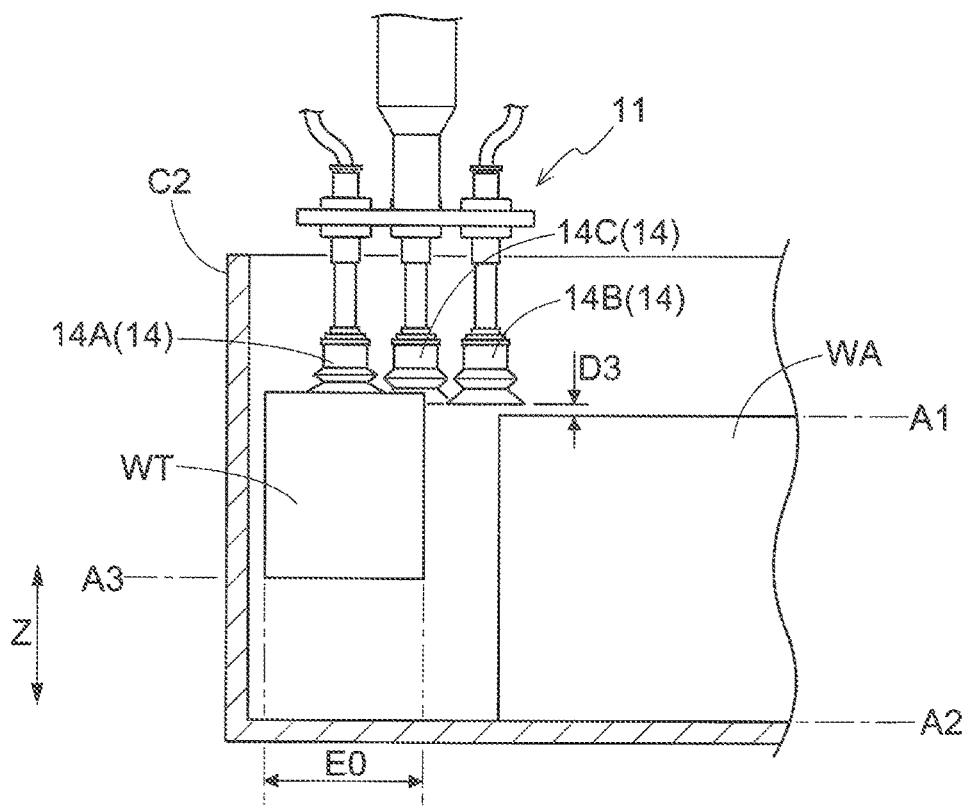
FIG. 17 is a diagram showing a state in which a target article is transferred according to third loading control.

In the case where the loaded articles WA are all loaded articles that do not have a loaded article WA placed on the upper surface, the loaded articles WA are appropriate loaded articles WA5, and furthermore the holding unit 11 is overlapped with a loaded article WA located around the loading area E0 in a view along the vertical direction Z, if the height A1 of the projectable area exceeds the sum of the height A2 of the upper surface of the loading area E0, the height of the target article WT, and the third specified distance D3 as shown in FIG. 17, the third loading control is executed, whereas if the height A1 of the projectable area is lower than the sum of the height A2 of the upper surface of the loading area E0, the height of the target article WT, and the third specified distance D3 as shown in FIG. 16, the first loading control is executed.

The following describes the case where the loaded articles WA include both a loaded article WA that does not have another loaded article WA placed on the upper surface and a loaded article WA that has another loaded article WA placed on the upper surface, and the holding unit 11 is not overlapped with a loaded article WA located around the loading area E0 in a view along the vertical direction Z.

Figure 18:
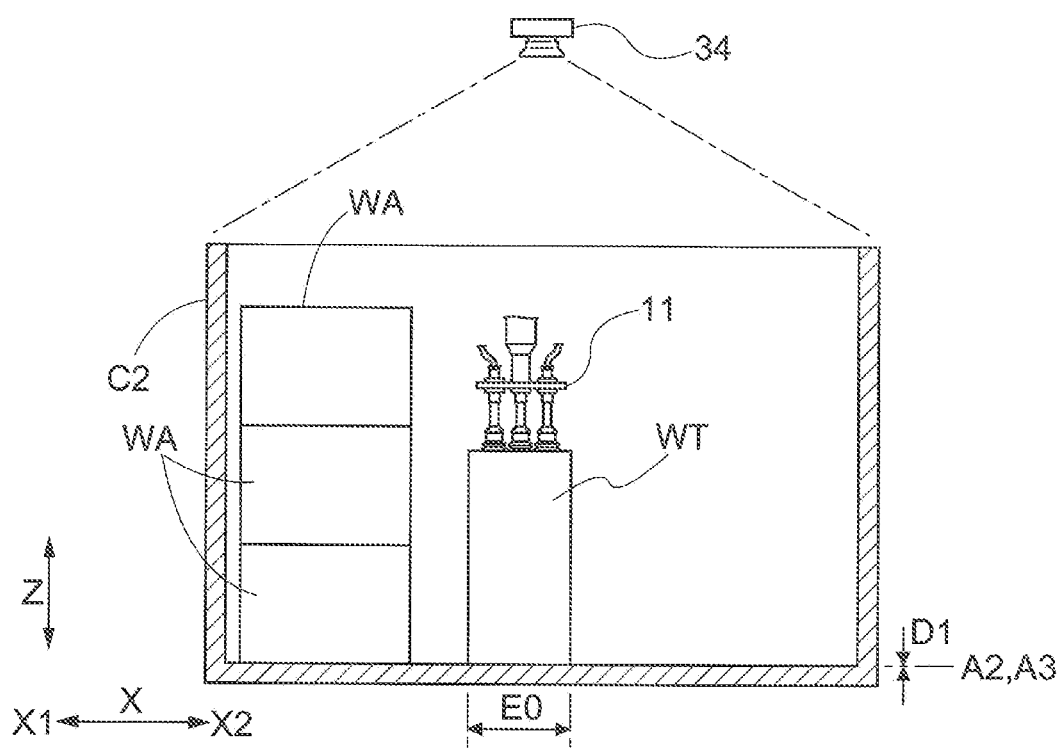
FIG. 18 is a diagram showing a state in which a target article is transferred according to the first loading control.
Figure 19:
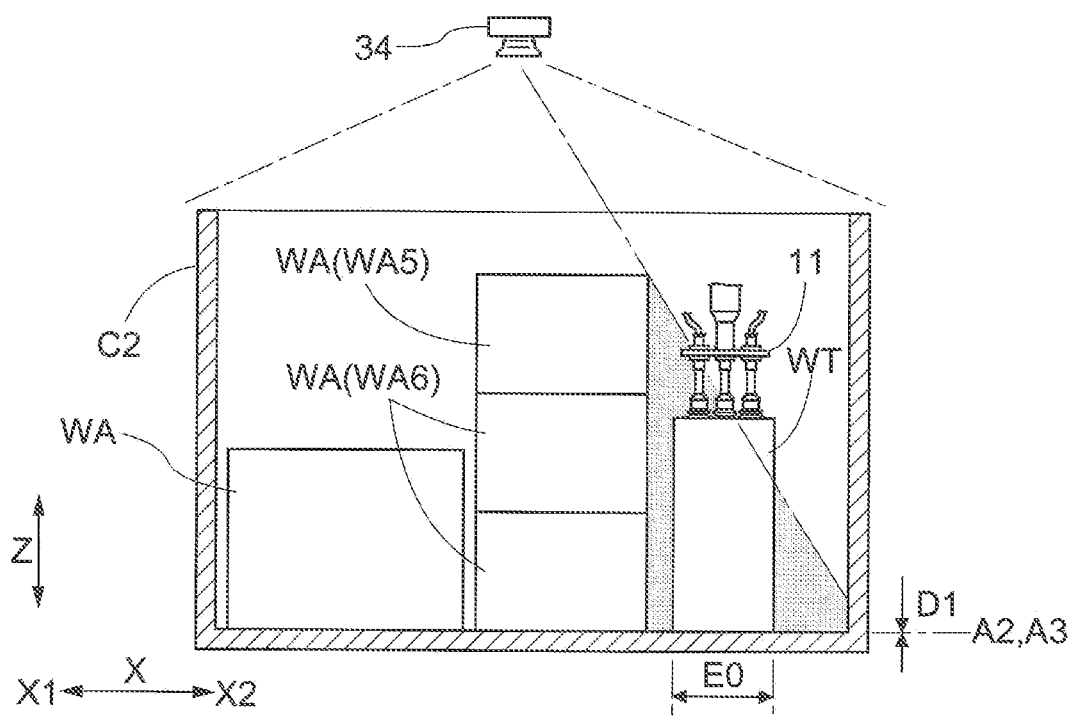
FIG. 19 is a diagram showing a state in which a target article is transferred according to the first loading control.
Figure 22:
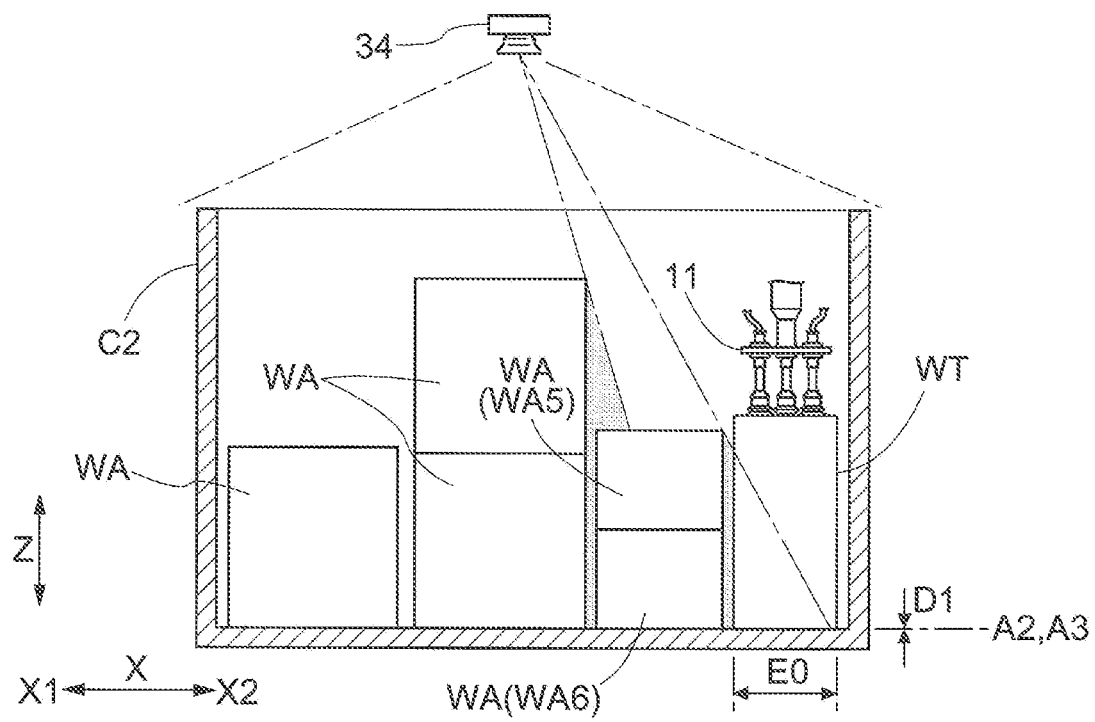
FIG. 22 is a diagram showing a state in which a target article is transferred according to the first loading control.

FIG. 18 shows a state in which the entire upper surface of the loading area E0 appears in an image captured by the second image capturing device 34. FIGS. 19 and 22 show states in which at least a portion of the upper surface of the loading area E0 is in a blind spot of the second image capturing device 34, but all of the loaded articles WA that do not have another loaded article WA placed on the upper surface are appropriate loaded articles WA5, and all of the loaded articles WA that have another loaded article WA placed on the upper surface are past appropriate loaded articles WA6. The first loading control is executed in the case where the entire upper surface of the loading area E0 appears in a captured image as shown in FIG. 18 and in the case where, as shown in FIGS. 19 and 22, all of the loaded articles WA that do not have another loaded article WA placed on the upper surface are appropriate loaded articles WA5, and all of the loaded articles WA that have another loaded article WA placed on the upper surface are past appropriate loaded articles WA6.

Figure 20:
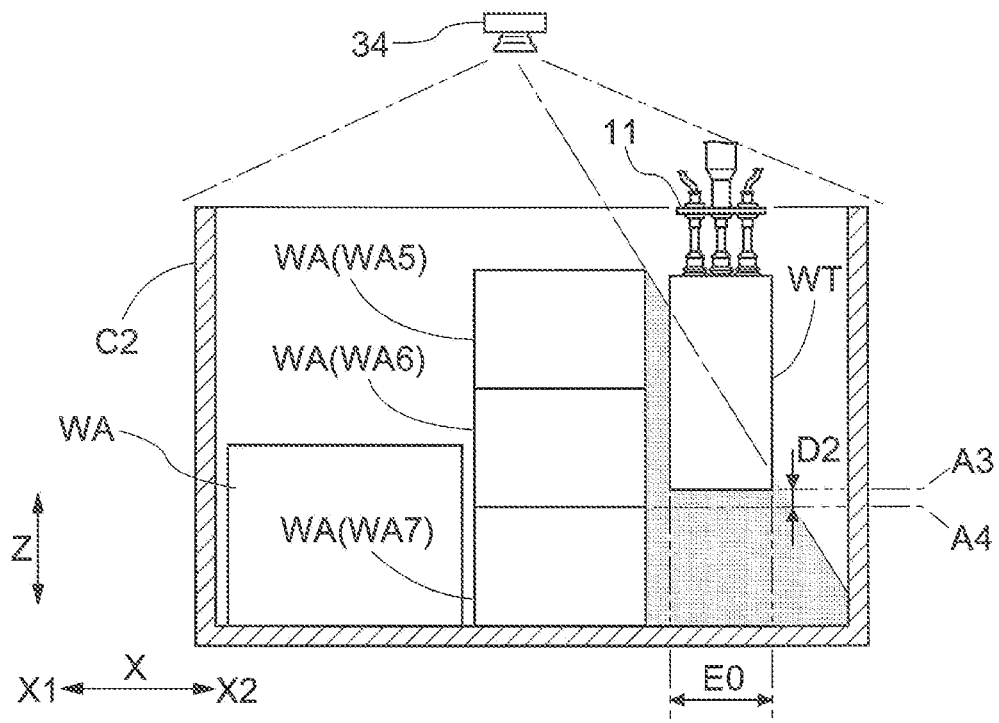
FIG. 20 is a diagram showing a state in which a target article is transferred according to second loading control.
Figure 21:
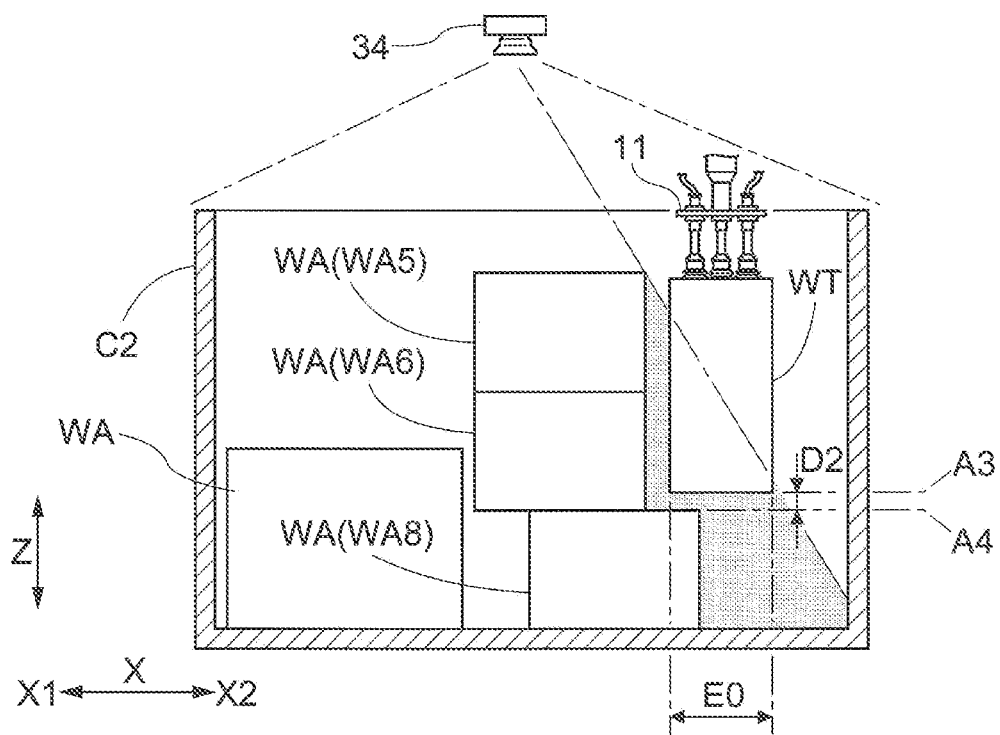
FIG. 21 is a diagram showing a state in which a target article is transferred according to the second loading control.
Figure 23:
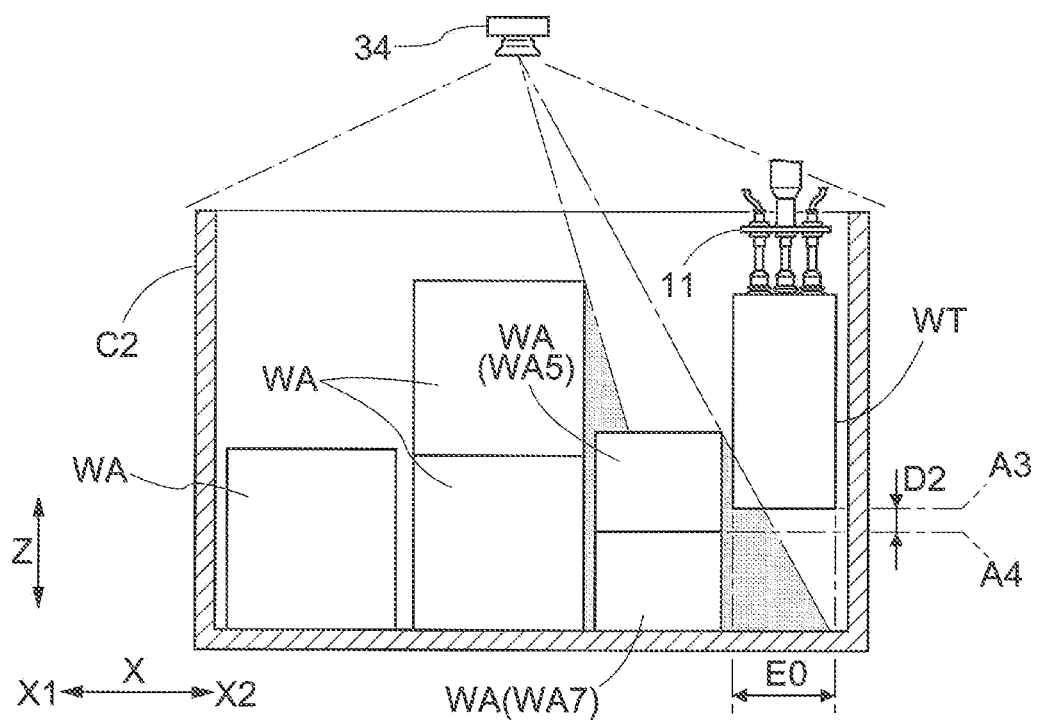
FIG. 23 is a diagram showing a state in which a target article is transferred according to the second loading control.
Figure 24:
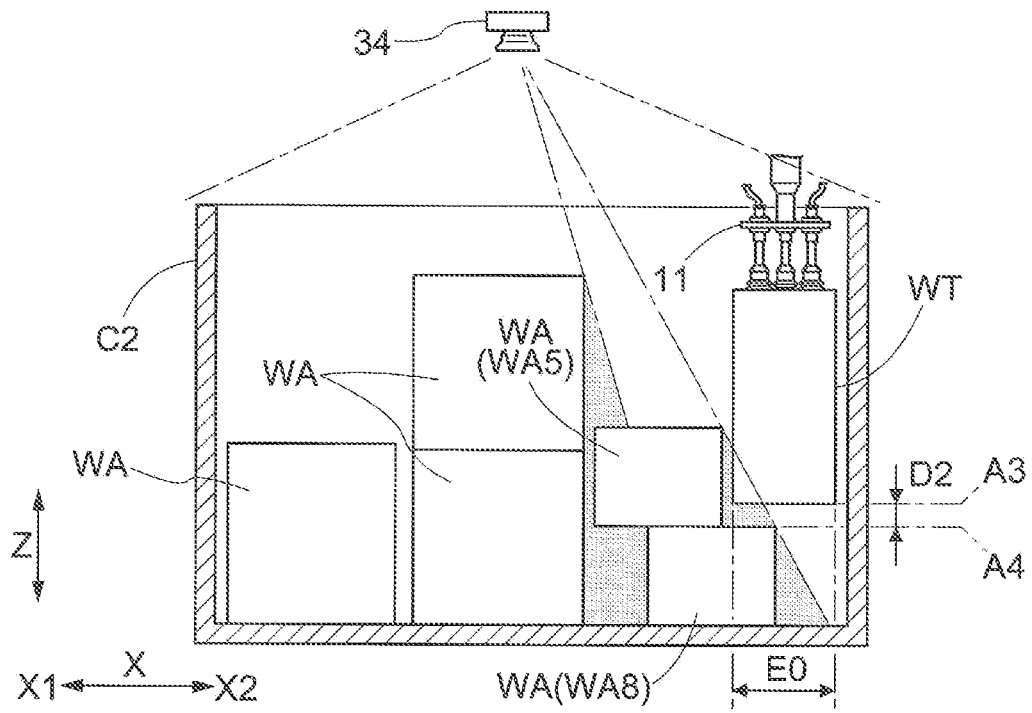
FIG. 24 is a diagram showing a state in which a target article is transferred according to the second loading control.

FIGS. 20 and 23 show states where at least a portion of the upper surface of the loading area E0 is in a blind spot of the second image capturing device 34, and one of the loaded articles WA that have another loaded article WA placed on the upper surface is a past uncertain loaded article WA7, but all of the loaded articles WA that do not have another loaded article WA placed on the upper surface are appropriate loaded articles WA5. FIGS. 21 and 24 show states where at least a portion of the upper surface of the loading area E0 is in a blind spot of the second image capturing device 34, and one of the loaded articles WA that have another loaded article WA placed on the upper surface is a past inappropriate loaded article WA8, but all of the loaded articles WA that do not have another loaded article WA placed on the upper surface are appropriate loaded articles WA5. As shown in FIGS. 20, 21, 23, and 24, the second loading control is executed in the case where all of the loaded articles WA that do not have another loaded article WA placed on the upper surface are appropriate loaded articles WA5, and at least one of the loaded articles WA that have another loaded article WA placed on the upper surface is a past inappropriate loaded article WA8 or a past uncertain loaded article WA7.

FIG. 25 shows a state in which at least a portion of the upper surface of the loading area E0 is in a blind spot of the second image capturing device 34, and one of the loaded articles WA that does not have another loaded article WA placed on the upper surface is an inappropriate loaded article WA9. If at least one of the loaded articles WA is an inappropriate loaded article WA9 as shown in FIG. 25, shift control is executed. Also, although not shown, shift control is also executed in the case where at least one of the loaded articles WA is an inappropriate loaded article WA and a portion of the loading area E0 does not appear in the captured image due to the presence of the inappropriate loaded article WA above the loading area E0. Also, although not shown, shift control is also executed in the case where at least one of the loaded articles WA is an inappropriate loaded article WA and a portion of the loading area E0 does not appear in the captured image due to the presence of the inappropriate loaded article WA above the loading area E0.

2. Other Embodiments

Next, other embodiments of the article loading facility will be described.

(1) In the above embodiment, the transfer device 3 is provided with the holding unit 11 that holds the upper surface of the article W by suction or the like, and the upper portion of the article W is held by such a holding unit 11, but the configuration of the transfer device 3 may be changed as appropriate. Specifically, in addition to or in place of the holding unit 11 that holds the upper surface of the article W, the transfer device 3 may include a holding unit that holds the upper portion of the article W by clamping the upper portion of the article W, or a holding unit that holds the upper portion of the article W by engaging with the upper portion of the article W. Also, the transfer device 3 may be provided with a side surface holding unit for holding a side surface of the article W in addition to the holding unit 11 for holding the upper surface of the article W.

(2) In the above embodiment, if a portion of the loading area E0 is in a blind spot of the second image capturing device 34 due to the presence of a loaded article WA, and thus a portion of the loading area E0 is not included in the captured image information, then the control unit H determines that it is uncertain whether a loaded article WA is not present in the loading area E0, but in addition to or in place of such a determination, the control unit H may determine that it is uncertain whether a loaded article WA is not present in the loading area E0 if a portion corresponding to a portion of the loading area E0 cannot be recognized through image recognition due to light illuminating the loading area E0, the shadow of a target article WT in the loading area E0, or the pattern, color, or the like of the upper surface of a loaded article WA in the loading area E0.

(3) In the above embodiment, the loading area E0 is set larger than the area of overlap with the article W at the loading position in a view along the vertical direction Z, but the relationship between the size of the loading area E0 and the size of the area of overlap with the article W at the loading position in a view along the vertical direction Z may be changed as appropriate. Specifically, for example, in the case where the holding unit 11 is not moved toward the first lengthwise side X1 and the first widthwise side Y1 after the target article WT is moved to the loading preparation position, the size of the loading area E0 may be the same as the size of the area of overlap with the article W at the loading position in a view along the vertical direction Z.

(4) In the above embodiment, the support is a foldable container, but the support (container) may be another type of container such as a cardboard box or a tray. Also, in the above embodiment, the support is a container provided with the loading portion 6 and the side wall portion 7, but may not be provided with the side wall portion 7, as in the case of a pallet.

(5) In the above embodiment, the second conveyor 2 transports the second container C2 in an orientation in which the lengthwise direction X of the second container C2 extends along the transport direction of the second container C2, but the second conveyor 2 may transport the second container C2 in an orientation in which the widthwise direction Y of the second container C2 extends along the transport direction of the second conveyor 2. Similarly, the first conveyor 1 may transport the first container C1 in an orientation in which the widthwise direction Y of the first container C1 extends along the transport direction of the first conveyor 1.

(6) In the above embodiment, one image capturing device is used to capture an image of the first container C1 located at the first transport position P1 and the articles W stored in the first container C1, and a different image capturing device is used to capture an image of the second container C2 located at the second transport position P2 and the articles W stored in the second container C2, but a single image capturing device may be used to capture an image of the first container C1 located at the first transport position P1 and the articles W stored in the first container C1 and also capture an image of the second container C2 located at the second transport position P2 and the articles W stored in the second container C2.

(7) In the above embodiment, as shown in FIGS. 13 to 15, the loading area E0 is set such that the entirety of the side that extends along the lengthwise direction X on the first widthwise side Y1 is adjacent to a loaded article WA or the side wall portion 7, and furthermore the side that extends along the widthwise direction Y on the first lengthwise side X1 is adjacent to a loaded article WA or the side wall portion 7. However, as shown in FIGS. 27 and 28, the loading area E0 may be set such that only a portion of the side that extends along the lengthwise direction X on the first widthwise side Y1 (hereinafter referred to as a first side S1) is adjacent to a loaded article WA or the side wall portion 7, or such that only a portion of the side that extends along the widthwise direction Y on the first lengthwise side X1 (hereinafter referred to as a second side S2) is adjacent to a loaded article WA or the side wall portion 7.

Figure 27:
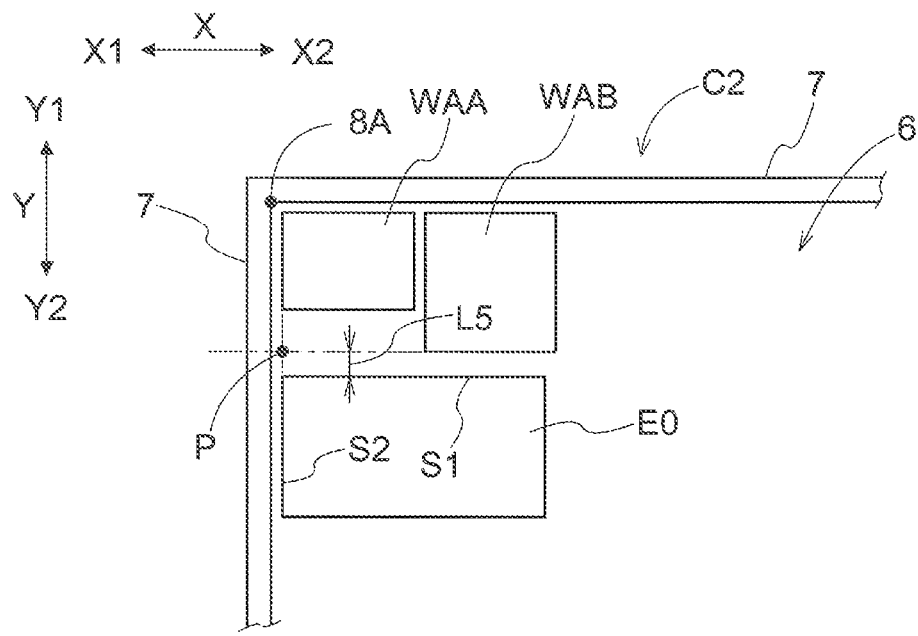
FIG. 27 is a diagram showing a loading area in another embodiment.

Specifically, in the case where, as shown in FIG. 27, a fifth loaded article WAA and a sixth loaded article WAB are side-by-side in the lengthwise direction X such that the fifth loaded article WAA is located on the first lengthwise side X1 of the sixth loaded article WAB, and the loading area E0 is to be set on the second widthwise side Y2 of the fifth loaded article WAA and the sixth loaded article WAB, the loading area E0 may be set as follows. It may be set such that the intersection of the first side S1 and the second side S2 of the loading area E0 matches an intersection P of an extension line of the side of the fifth loaded article WAA that extends along the widthwise direction Y on the first lengthwise side X1 and an extension line of the side of the sixth loaded article WAB that extends along the lengthwise direction X on the second widthwise side Y2.

Figure 28:
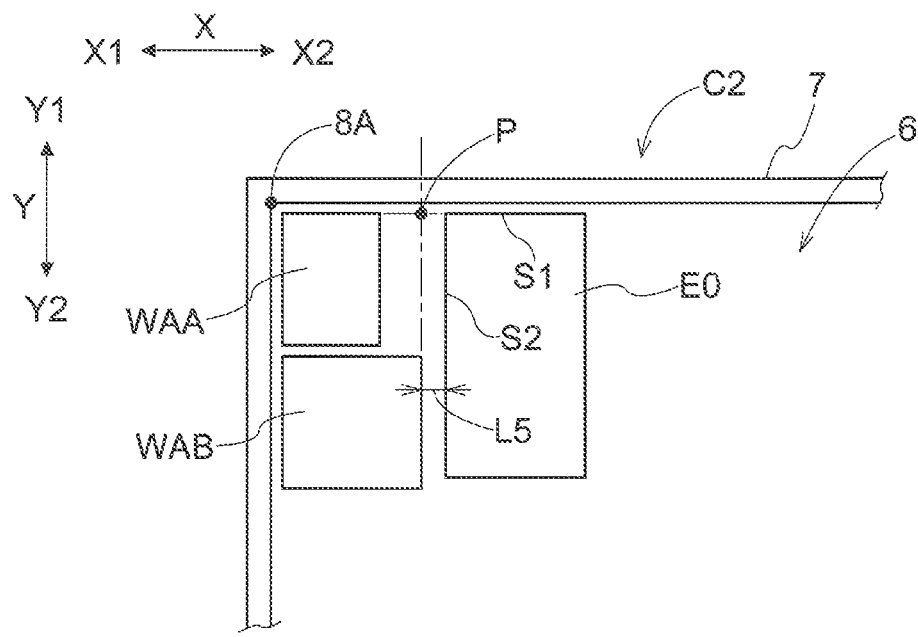
FIG. 28 is a diagram showing a loading area in another embodiment.

Also, in the case where, as shown in FIG. 28, the fifth loaded article WAA and the sixth loaded article WAB are side-by-side in the widthwise direction Y such that the fifth loaded article WAA is located on the first widthwise side Y1 of the sixth loaded article WAB, and the loading area E0 is to be set on the second lengthwise side X2 of the fifth loaded article WAA and the sixth loaded article WAB, the loading area E0 may be set as follows. It may be set such that the intersection of the first side S1 and the second side S2 of the loading area E0 matches the intersection P of an extension line of the side of the fifth loaded article WAA that extends along the lengthwise direction X on the first widthwise side Y1 and an extension line of the side of the sixth loaded article WAB that extends along the widthwise direction Y on the second lengthwise side X2.

It should be noted that in the examples shown in FIGS. 27 and 28, the loading area E0 is set such that a gap L5 having a set length (e.g., 5 mm or less) is formed between the loading area E0 and the extension line of the sixth loaded article WAB.

(8) Note that the configurations disclosed in each of the above-described embodiments can be applied in combination with configurations disclosed in other embodiments as long as no contradiction arises. With respect to other configurations as well, the embodiments disclosed in the present specification are merely exemplary in all respects. Therefore, various modifications can be made as appropriate without departing from the gist of the present disclosure.

3. Outline of Above Embodiments

Hereinafter, an outline of aspects of the article loading facility described above will be described.

In one aspect, the article loading facility includes: a loading operation unit configured to place a plurality of articles on a support; and a control unit configured to control the loading operation unit, the loading operation unit including a holding unit configured to hold upper portions of the articles, and the control unit controlling the loading operation unit so as to place the articles on the support in accordance with arrangement information that indicates an orientation and a position on the support for each of the articles, wherein the article loading facility further includes an image capturing device that is disposed above the support and is configured to capture an image of the support and a loaded article, the loaded article being an article that has been placed on the support, the control unit executes setting control for setting a loading surface region on which a target article among the articles is to be placed on an upper surface of the support or an upper surface of the loaded article, first loading control that is executed if it was determined that the loaded article is not present above the loading surface region based on captured image information obtained by the image capturing device, and second loading control that is executed if it was determined that it is uncertain whether the loaded article is not present above the loading surface region based on the captured image information, the first loading control is control for placing the target article on the support by causing the holding unit to release the target article at a position at which the target article is directly above the loading surface region and furthermore a lower surface of the target article is higher than the upper surface of the loading surface region by a first specified distance, and the second loading control is control for placing the target article on the support by causing the holding unit to release the target article at a position at which the target article is directly above the loading surface region and furthermore the lower surface of the target article is higher, by a second specified distance, than a height at which it is uncertain whether the loaded article is not present in the loading surface region.

According to this configuration, the control unit executes the first loading control if it was determined that the loaded article is not present above the loading surface region based on the captured image information obtained by the image capturing device. In this first loading control, the target article is placed on the loading surface region in a state where a loaded article is not present above the loading surface region, and therefore the target article can be placed on the loading surface region without coming into contact with a loaded article adjacent to the target article. Also, by releasing the target article in a state of being close to the loading surface region, it is easy to appropriately place the target article on the loading surface region in accordance with the arrangement information.

Also, if it was determined that it is uncertain whether a loaded article is not present above the loading surface region based on the captured image information, the control unit executes the second loading control. In this second loading control, the target article is released when the lower surface of the target article is higher than the uncertain height, thus making it possible to avoid the case where the target article held by the holding unit comes into contact with a loaded article that is present above the loading surface region, and making it possible to prevent damage to the loaded article and the target article.

Here, it is preferable that if a portion of the loading surface region is not included in the captured image information due to the portion of the loading surface region being in a blind spot of the image capturing device, the control unit determines that it is uncertain whether the loaded article is not present in the loading surface region.

According to this configuration, the second loading control is executed if a portion of the loading surface region is not included in the captured image information due to the loading surface region being in a blind spot of the image capturing device. Accordingly, if there is a possibility that the loaded article is present in the blind spot due to a portion of the loading surface region being in the blind spot, it is possible to avoid the case where the target article held by the holding unit comes into contact with the loaded article, and it is possible to prevent damage to the loaded article and the target article.

Also, it is preferable that even in a case where the portion of the loading surface region is not included in the captured image information due to the portion of the loading surface region being in the blind spot of the image capturing device, if an edge portion of an upper surface of a blind-spot-forming article, which is the loaded article that forms the blind spot, is included in the captured image information and furthermore the edge portion of the upper surface of the blind-spot-forming article matches the position of the corresponding article in the arrangement information, the control unit determines that the loaded article is not present above the loading surface region.

If an edge portion of the upper surface of the blind-spot-forming article that forms a blind spot in the loading surface region matches the position of the article indicated in the arrangement information, it is highly likely that the blind-spot-forming article has been placed on the support at the position and orientation indicated by the arrangement information and is not present above the loading surface region. For this reason, according to the above configuration, if an edge portion of the upper surface of the blind-spot-forming article matches the position of the article indicated in the arrangement information, it is determined that a loaded article is not present above the loading surface region, and the first loading control is executed, thus making it easier to appropriately place the target article on the loading surface region in accordance with the arrangement information.

Also, it is preferable that based on captured image information obtained by the image capturing device at a time that is after the target article that is one of the articles was placed on the support and is before a subsequent article after the target article is placed on the support, the control unit executes appropriateness determination control for determining whether or not the position of the target article that was placed on the support is appropriate with respect to the position indicated in the arrangement information, and stores a result of the appropriateness determination control, and wherein even in a case where the portion of the loading surface region is not included in the captured image information due to the portion of the loading surface region being in the blind spot of the image capturing device, if it was determined that the position of a surrounding article, which is the loaded article that is present around the loading surface region, is appropriate in the appropriateness determination control, the control unit determines that the loaded article is not present above the loading surface region.

If the position of the loaded article immediately after being placed on the support is appropriate with respect to the position indicated in the arrangement information, it is highly likely that the position will be appropriate even after another article is subsequently placed on the support. For this reason, according to the above configuration, it is determined that such a loaded article is in an appropriate position and is not present above the loading surface region, and the first loading control is executed, thus making it easier to appropriately place the target article on the loading surface region in accordance with the arrangement information.

INDUSTRIAL APPLICABILITY

The technology according to the present disclosure is applicable to an article loading facility that includes a loading operation unit for placing a plurality of articles on a support.

DESCRIPTION OF REFERENCE SIGNS

3 Transfer device goading operation unit)
11 Holding unit
34 Second image capturing device (image capturing device)
C2 Second container (support)
D1 First specified distance
D2 Second specified distance
E0 Loading area (loading surface region)
H Control unit
W Article
WA Loaded article

The invention claimed is:

1. An article loading facility comprising:
a loading operation unit configured to place a plurality of articles on a support; and
a control unit configured to control the loading operation unit,
the loading operation unit including a holding unit configured to hold upper portions of the articles, and
wherein
the control unit controls the loading operation unit so as to place the articles on the support in accordance with arrangement information that indicates an orientation and a position on the support for each of the articles,
the article loading facility further comprises an image capturing device that is disposed above the support and is configured to capture an image of the support and a loaded article, the loaded article being an article that has been placed on the support,
the control unit executes setting control for setting a loading surface region on which a target article among the articles is to be placed on an upper surface of the support or an upper surface of the loaded article, a first loading control that is executed if it was determined that the loaded article is not present above the loading surface region based on captured image information obtained by the image capturing device, and a second loading control that is executed if it was determined that it is uncertain whether the loaded article is not present above the loading surface region based on the captured image information,
the first loading control is a control for placing the target article on the support by causing the holding unit to release the target article at a position at which the target article is directly above the loading surface region and a lower surface of the target article is higher than the upper surface of the loading surface region by a first specified distance, and
the second loading control is a control for placing the target article on the support by causing the holding unit to release the target article at a position at which the target article is directly above the loading surface region and the lower surface of the target article is higher, by a second specified distance, than a height at which it is uncertain whether the loaded article is not present in the loading surface region.

2. The article loading facility according to claim 1, wherein if a portion of the loading surface region is not included in the captured image information due to the portion of the loading surface region being in a blind spot of the image capturing device, then the control unit determines that it is uncertain whether the loaded article is not present in the loading surface region.

3. The article loading facility according to claim 2, wherein in a case where the portion of the loading surface region is not included in the captured image information due to the portion of the loading surface region being in the blind spot of the image capturing device, if an edge portion of an upper surface of a blind-spotforming article, which is the loaded article that forms the blind spot, is included in the captured image information and the edge portion of the upper surface of the blind-spot-forming article matches the position of the corresponding article in the arrangement information, then the control unit determines that the loaded article is not present above the loading surface region.

4. The article loading facility according to claim 2,
wherein, based on captured image information obtained by the image capturing device at a time that is after the target article that is one of the articles was placed on the support and is before a subsequent article after the target article is placed on the support, the control unit executes appropriateness determination control for determining whether or not the position of the target article that was placed on the support is appropriate with respect to the position indicated in the arrangement information, and stores a result of the appropriateness determination control, and
wherein in a case where the portion of the loading surface region is not included in the captured image information due to the portion of the loading surface region being in the blind spot of the image capturing device, if it was determined that the position of a surrounding article, which is the loaded article that is present around the loading surface region, is appropriate in the appropriateness determination control, then the control unit determines that the loaded article is not present above the loading surface region.

5. The article loading facility according to claim 3,
wherein, based on captured image information obtained by the image capturing device at a time that is after the target article that is one of the articles was placed on the support and is before a subsequent article after the target article is placed on the support, the control unit executes appropriateness determination control for determining whether or not the position of the target article that was placed on the support is appropriate with respect to the position indicated in the arrangement information, and stores a result of the appropriateness determination control, and
wherein in a case where the portion of the loading surface region is not included in the captured image information due to the portion of the loading surface region being in the blind spot of the image capturing device, if it was determined that the position of a surrounding article, which is the loaded article that is present around the loading surface region, is appropriate in the appropriateness determination control, then the control unit determines that the loaded article is not present above the loading surface region.

\* \* \* \* \*